United States Patent
Valikodath et al.

(10) Patent No.: US 11,604,492 B1
(45) Date of Patent: *Mar. 14, 2023

(54) SLIDING ELECTRONIC DEVICES WITH TRANSLATING FLEXIBLE DISPLAYS AND ELECTROCHEMICAL CELL ROLLERS

(71) Applicant: Motorola Mobility LLC, Chicago, IL (US)

(72) Inventors: Nigil George Valikodath, Elmhurst, IL (US); George B Standish, Marengo, IL (US)

(73) Assignee: Motorola Mobility LLC, Chicago, IL (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/520,428

(22) Filed: Nov. 5, 2021

(51) Int. Cl.
*G06F 1/16* (2006.01)

(52) U.S. Cl.
CPC .......... *G06F 1/1652* (2013.01); *G06F 1/1635* (2013.01)

(58) Field of Classification Search
CPC ............ H04M 1/0235; H04M 1/0237; H04M 1/0239; G06F 1/1624; G06F 1/1635; G06F 1/1652; H02J 7/16
See application file for complete search history.

(56) References Cited

U.S. PATENT DOCUMENTS

| | | | | |
|---|---|---|---|---|
| 6,242,827 B1 * | 6/2001 | Wolf | | H02K 35/00 310/74 |
| 7,310,050 B2 * | 12/2007 | Yeh | | G06F 1/1652 345/905 |
| 7,463,238 B2 * | 12/2008 | Funkhouser | | G06F 21/83 345/905 |
| 9,960,635 B2 * | 5/2018 | Wilkinson | | H02J 7/35 |
| 10,224,740 B2 * | 3/2019 | Wilkinson | | G06F 1/26 |
| 10,250,064 B2 * | 4/2019 | Park | | G06F 1/1635 |
| 10,431,999 B2 * | 10/2019 | Choe | | H02J 7/0042 |
| 2005/0040962 A1 * | 2/2005 | Funkhouser | | G09F 9/301 340/815.4 |
| 2006/0176243 A1 * | 8/2006 | Yeh | | G06F 1/1656 345/30 |

(Continued)

FOREIGN PATENT DOCUMENTS

| | | | | |
|---|---|---|---|---|
| KR | 20040026558 | * | 3/2004 | .............. H02N 2/18 |
| KR | 100578520 B1 | * | 5/2006 | .......... H04M 1/0262 |

OTHER PUBLICATIONS

"Samsung Rollable Display Devicew itht Fingerprint Sensor", Lets Go Digital; Viewed online at https://en.letsgodigital.org/foldable-devices/samsung-rollable-tablet-display/ Feb. 3, 2022; Unknown publication date but prior to filing of present application.

(Continued)

*Primary Examiner* — Adrian S Wilson
(74) *Attorney, Agent, or Firm* — Philip H. Burrus, IV

(57) ABSTRACT

An electronic device includes a flexible display. A device housing provides a translation surface for the flexible display. A rotor positioned within a curvilinear section of the flexible display rotates with translation of the flexible display across the translation surface. The rotor can be a rechargeable electrochemical cell, can be a rechargeable electrochemical cell situated within a sheath, or can be positioned within a housing defining an outer surface of the rotor to save space within the electronic device.

20 Claims, 11 Drawing Sheets

(56) References Cited

U.S. PATENT DOCUMENTS

2007/0146243 A1* 6/2007 Ou Yang ............... G06F 1/1601
                                                345/76
2017/0170677 A1* 6/2017 Park ...................... G06F 1/1635
2017/0187233 A1* 6/2017 Wilkinson ................ G06F 1/26
2018/0233945 A1* 8/2018 Wilkinson ................ G06F 1/26

OTHER PUBLICATIONS

"USB Rechargeable Motorized Turntable Display", Knowza; Unknown Publication Date but prior to filing of present application; Viewed online Feb. 3, 2022 at https://www.walmart.com/ip/USB-Rechargeable-Motorized-Turntable-Dis...elry-Watch-Digital-Product-Glass-Bag-Models-Collectibles/877280621.

* cited by examiner

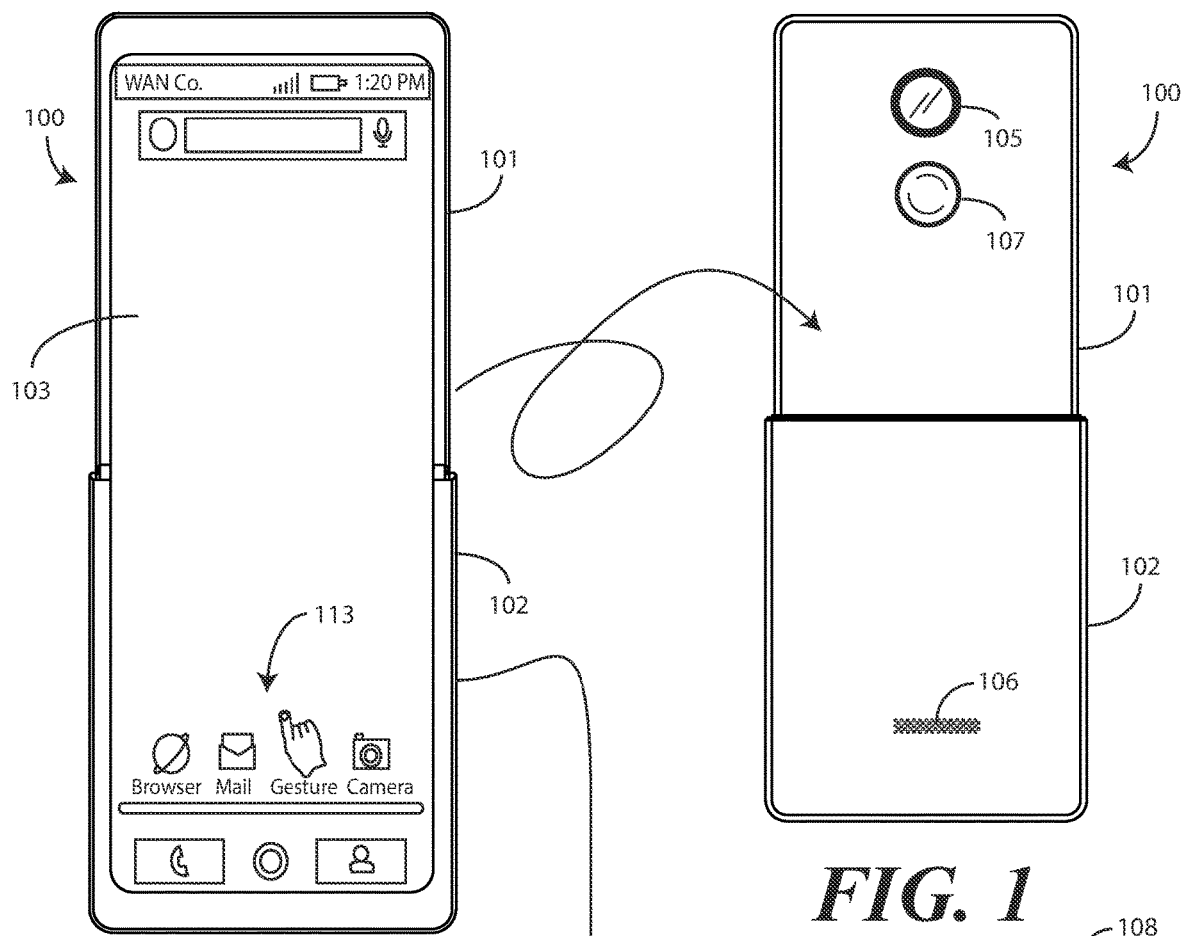
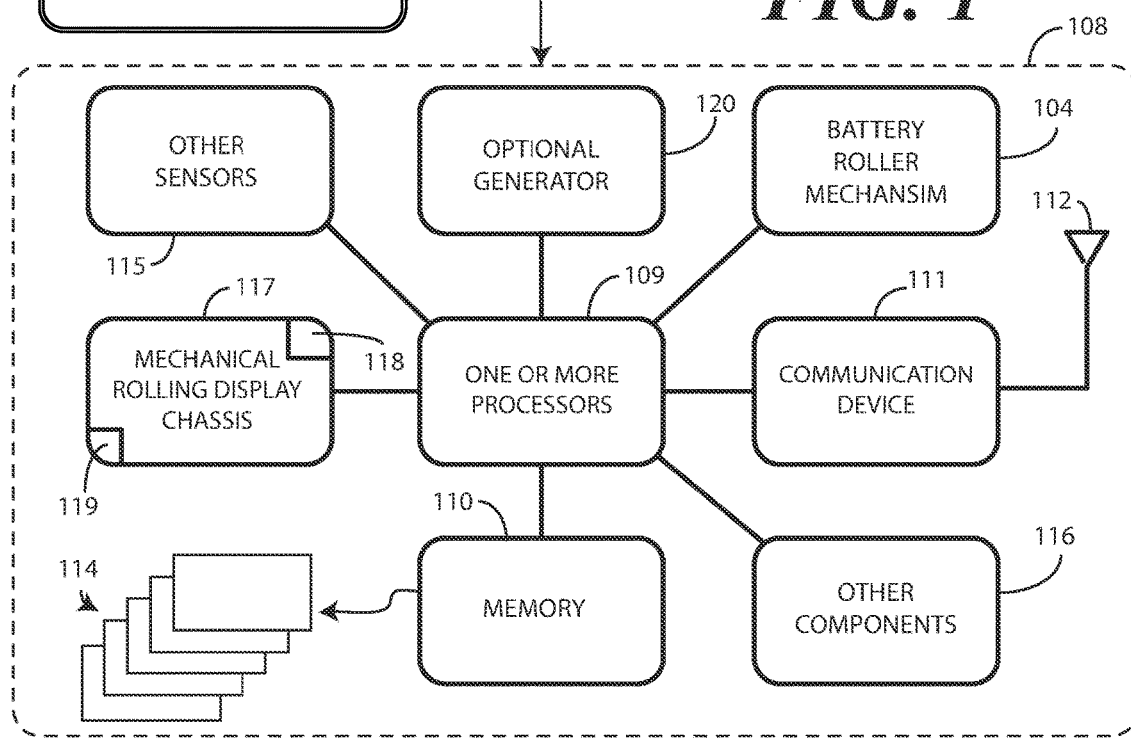
FIG. 1

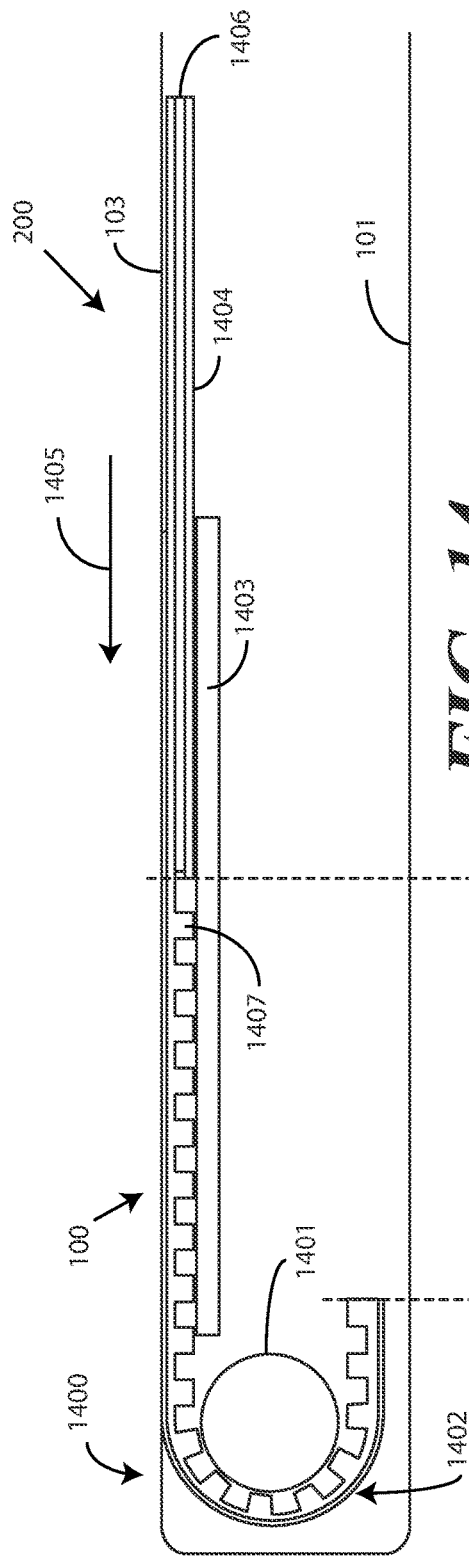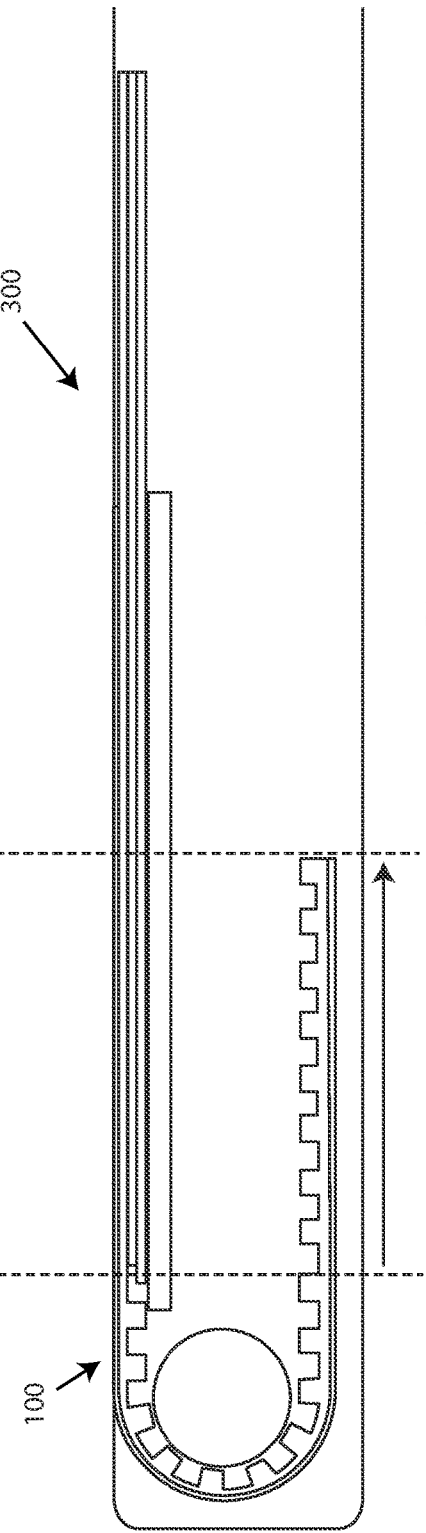

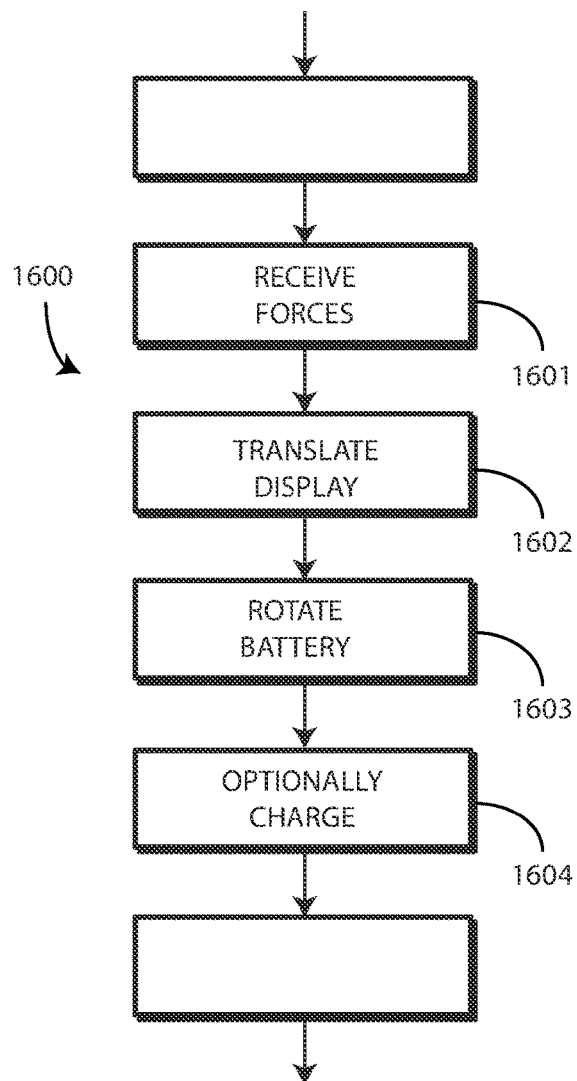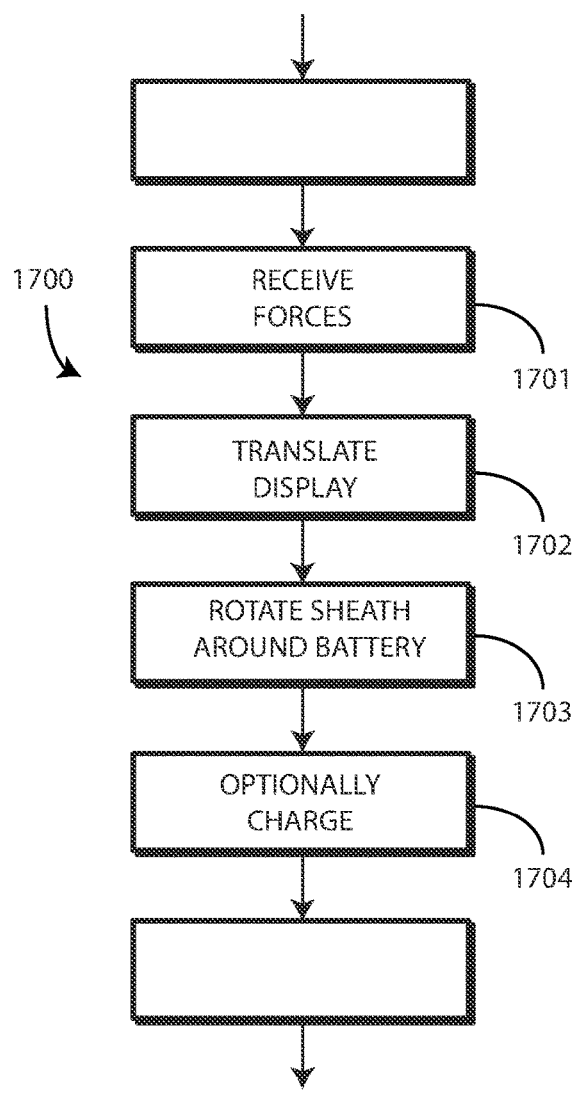
FIG. 16
FIG. 17

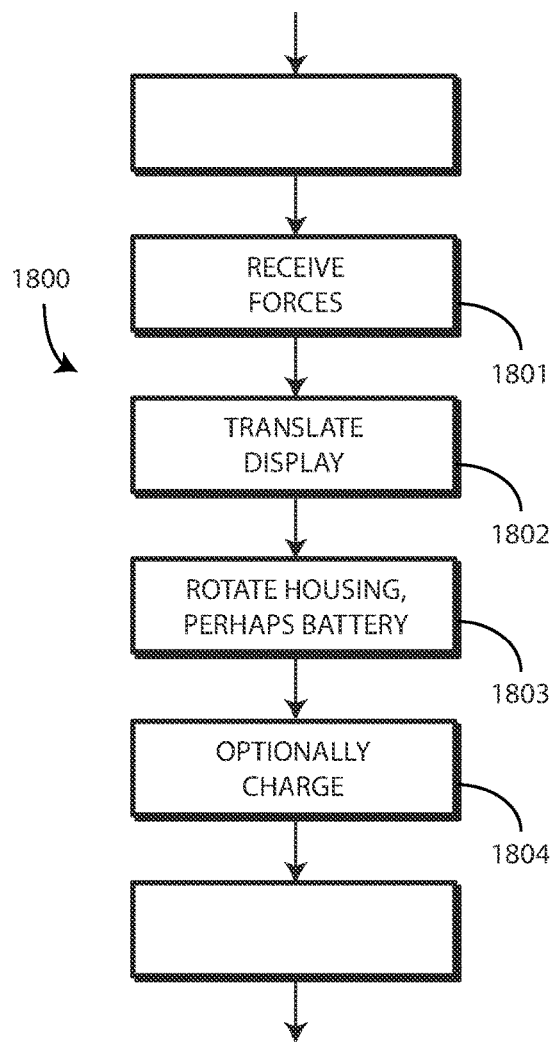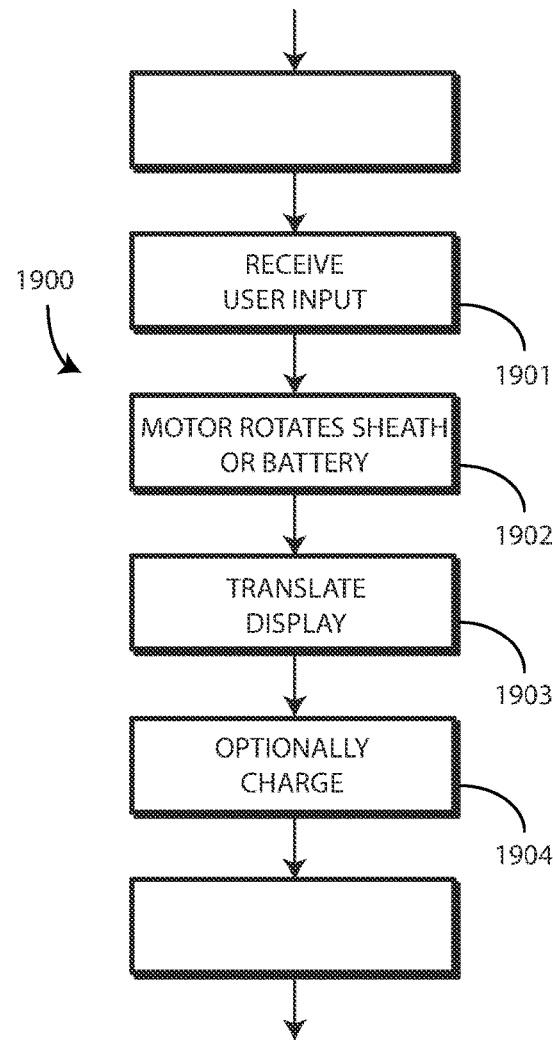
*FIG. 18*  *FIG. 19*

# SLIDING ELECTRONIC DEVICES WITH TRANSLATING FLEXIBLE DISPLAYS AND ELECTROCHEMICAL CELL ROLLERS

BACKGROUND

Technical Field

This disclosure relates generally to electronic devices, and more particularly to electronic devices having housings that slide relative to each other.

Background Art

Portable electronic communication devices, especially smartphones, have become ubiquitous. People all over the world use such devices to stay connected. These devices have been designed in various mechanical configurations. A first configuration, known as a "candy bar," is generally rectangular in shape, has a rigid form factor, and has a display disposed along a major face of the electronic device. By contrast, a "clamshell" device has a mechanical hinge that allows one housing to pivot relative to the other. A third type of electronic device is a "slider" where one device housing slides relative to the other.

Some consumers prefer candy bar devices, while others prefer clamshell devices. Still others prefer sliders. The latter two types of devices are convenient in that they are smaller in a closed position than in an open position, thereby fitting more easily in a pocket. While clamshell devices are relatively straight forward mechanically, sliding devices are more complicated mechanically and electrically. It would thus be desirable to have an improved electronic device that not only provides a slider construction but allows for more efficient component placement therein.

BRIEF DESCRIPTION OF THE DRAWINGS

FIG. 1 illustrates one explanatory sliding electronic device in accordance with one or more embodiments of the disclosure.

FIG. 14 illustrates a side sectional view of another explanatory flexible display and rotor assembly situated within a device housing of a sliding electronic device when the sliding electronic device is open.

FIG. 15 illustrates a side sectional view the explanatory flexible display and rotor assembly of FIG. 14 situated within a device housing of a sliding electronic device when the sliding electronic device is closed.

FIG. 16 illustrates one explanatory method in accordance with one or more embodiments of the disclosure.

FIG. 17 illustrates another explanatory method in accordance with one or more embodiments of the disclosure.

FIG. 18 illustrates still another explanatory method in accordance with one or more embodiments of the disclosure.

FIG. 19 illustrates yet another explanatory method in accordance with one or more embodiments of the disclosure.

Figure 2:
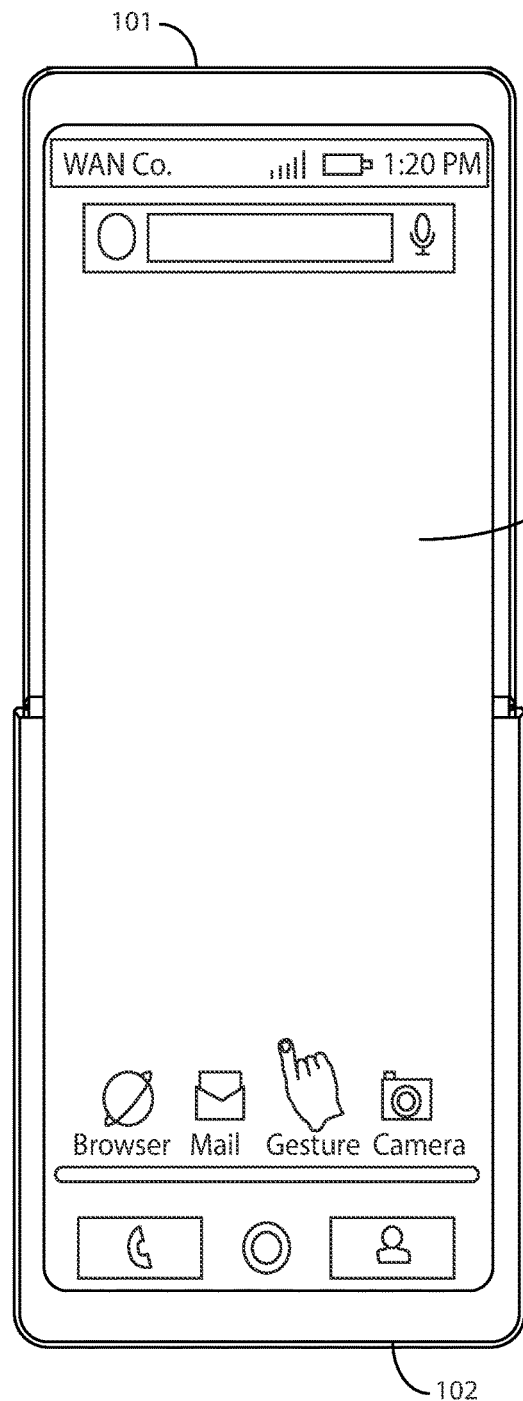
FIG. 2 illustrates one explanatory sliding electronic device in an open position.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present disclosure.

DETAILED DESCRIPTION OF THE DRAWINGS

Embodiments of the disclosure are now described in detail. Referring to the drawings, like numbers indicate like parts throughout the views. As used in the description herein and throughout the claims, the following terms take the meanings explicitly associated herein, unless the context clearly dictates otherwise: the meaning of "a," "an," and "the" includes plural reference, the meaning of "in" includes "in" and "on."

Relational terms such as first and second, top and bottom, and the like may be used solely to distinguish one entity or action from another entity or action without necessarily requiring or implying any actual such relationship or order between such entities or actions. As used herein, components may be "operatively coupled" when information can be sent between such components, even though there may be one or more intermediate or intervening components between, or along the connection path.

The terms "substantially", "essentially", "approximately", "about" or any other version thereof, are defined as being close to as understood by one of ordinary skill in the art, and in one non-limiting embodiment the term is defined to be within ten percent, in another embodiment within five percent, in another embodiment within one percent and in another embodiment within one-half percent. The term "coupled" as used herein is defined as connected, although not necessarily directly and not necessarily mechanically. Also, reference designators shown herein in parenthesis indicate components shown in a figure other than the one in discussion. For example, talking about a device (10) while discussing figure A would refer to an element, 10, shown in figure other than figure A.

Embodiments of the disclosure provide an electronic device that includes at least a first device housing and a second device housing. In one or more embodiments, the first device housing is configured to slide relative to the second device housing. Illustrating by example, in one explanatory embodiment, the first device housing slides into, and out of, the second device housing to change an overall length of the sliding electronic device. In other embodiments, the second device housing can slide into and out of the first device housing to achieve the same result. Accordingly, in one or more embodiments a sliding electronic device includes a first device housing and a second device housing that slide relative to each other to transition between a closed position, an open position, and a plurality of partially open positions therebetween.

In one or more embodiments, a flexible display is coupled to the first device housing and the second device housing. The flexible display engages a rotor in one device housing. When the first device housing and second device housing slide relative to each other, the flexible display wraps around the rotor to extend further from, or back into, the device housing in which the rotor is situated.

In one or more embodiments, a cross section of the flexible display defines a J-shape with a curved portion of the J-shape wrapped around the rotor and an upper portion of the J-shape passing across a translation surface of the device housing in which the rotor is situated. When the sliding electronic device opens, the upper portion of the J-shape becomes longer as the flexible display wraps around the rotor and extends further out of the device housing. When the sliding electronic device closes, the upper portion of the J-shape becomes shorter as the reverse operation occurs. Thus, when the first device housing translates relative to the second device housing, the flexible display deforms at different locations as it wraps and passes around the rotor. While a J-shape occurs in one explanatory embodiment, other shapes will occur when the flexible display is included with other device housings, electronic devices, or corresponding assemblies. Illustrating by example, in other embodiments a double roller could be used with the flexible display. In one embodiment, the double rollers define a pin shape that results in the flexible display having a cross-sectional shape that is different from a J-shape. Thus, shapes other than the J-shape described for illustrative purposes will be obvious to those of ordinary skill in the art having the benefit of this disclosure.

In one or more embodiments, the rotor not only facilitates the perceived "extension" of the flexible display that occurs during an opening operation, but also works to improve the reliability and usability of the flexible display. This is true because the rotor defines a service loop about which the flexible display curves. The service loop prevents the flexible display from being damaged or developing memory in the folded position when the electronic device is in the closed position.

In one or more embodiments, the flexible display comprises an assembly that includes a foldable substrate, a foldable display, and a fascia layer, as well as one or more adhesive layers to couple these components together. In one or more embodiments, the rotor about which the flexible display passes comprises a rechargeable electrochemical cell. Illustrating by example, in one or more embodiments the rotor is a rechargeable electrochemical cell, as the rechargeable electrochemical cell can be configured as a cylinder situated in a cylindrical can. The rechargeable electrochemical cell can then rotate when the flexible display translates across a translation surface of one of the first device housing or the second device housing when the first device housing and second device housing slide toward or away from each other.

In another embodiment, the rotor comprises the rechargeable electrochemical cell and an additional sheath positioned around an outer surface of the rechargeable electrochemical cell. When the flexible display translates across the translation surface of the first device housing and/or the second device housing, the sheath can rotate around the rechargeable electrochemical cell, thereby leaving the rechargeable electrochemical cell stationary. Having the rechargeable electrochemical cell remain stationary can help to simplify the electrode design in some embodiments. It can also allow the use of off the shelf rechargeable electrochemical cells as well.

In still another embodiment, the rotor comprises a rechargeable electrochemical cell and a housing that surrounds at least a portion of the rechargeable electrochemical cell. Illustrating by example, the housing can be a plastic part into which the rechargeable electrochemical cell situates. Having a housing, which can have a round perimeter, allows rechargeable electrochemical cells of different shapes to be used in the construction of the rotor. For instance, the rechargeable electrochemical cell can be a prismatic polymer cell, configured with a rectangular geometry and packaged in a foil pouch, rather than having to be cylindrical when the housing is used. The housing provides the rounded outer surfaces, while contours of an interior compartment of the housing can be configured to receive and accommodate a rechargeable electrochemical cell of different shapes and geometries.

Other components can be included with the rotor as well. For example, if the rotor is a cylindrical rechargeable electrochemical cell packaged in a can, in one or more embodiments a friction increasing coating can be applied to an outer surface of the rechargeable electrochemical cell. Similarly, a flexible substrate carrying one or more electrical components powered by the rechargeable electrochemical cell can be included in the assembly to travel with the flexible display within a predefined rotational range. Power management circuitry can be electrically coupled to the rechargeable electrochemical cell by one or more embodiments electrical contacts biased against, slidable along, or otherwise coupled to one or more embodiments electrodes of the rechargeable electrochemical cell. In still other embodiments, a regenerative charging circuit that generates power as the first device housing and second device housing slide relative to teach other can be configured to deliver a charge current to the rechargeable electrochemical cell when the device housings move relative to each other. A motor can even be included to drive the rotor for a more automated device operation. Of course, these options can be used in various combinations. Other options, features, and benefits suitable for use with a rotor that includes—or is—a rechargeable electrochemical cell will be described below. Still others will be obvious to those of ordinary skill in the art having the benefit of this disclosure.

Embodiments of the disclosure advantageously utilize what would otherwise be "dead space" in a slidable electronic device where a roller mechanism is required for a flexible display translate when the device housings slide relative to each other. By replacing such a roller with a rechargeable electrochemical cell, this space can be used as a power supply to power the electronic device. Embodiments of the disclosure also advantageously reduce the number of parts and bill of materials required to construct the electronic device by doubling the utility of the rotor and opening space within the electronic device previously occupied by the battery.

In one or more embodiments, a rotor comprises a cylindrical rechargeable electrochemical cell. The use of a cylindrical rechargeable electrochemical cell as a rotor advantageously utilizes space that would otherwise be occupied by a passive mechanical component. Embodiments of the disclosure are especially useful in larger rollable devices, such as laptops and tablet computers, as these devices allow for larger bending radii of their flexible displays, thereby allowing larger rechargeable electrochemical cells to be used as the rotors.

In one illustrative embodiment, a rechargeable electrochemical cell is configured in a cylindrical housing and situated within a device housing of an electronic device such that it can rotate along its major axis, thereby acting as a support roller for a flexible display. Where the rechargeable electrochemical cell is allowed to rotate, electrical connections can be made by a contact that slides. For instance, the rechargeable electrochemical cell can have concentrically aligned exterior electrodes against which electrical contacts may be biased. Alternatively, a flexible circuit that operates within a predefined rotating range can be attached to the rechargeable electrochemical cell, with the flexible circuit rolling, and unrolling, about the rechargeable electrochemical cell as the device housings slide relative to each other.

In other embodiments, the rechargeable electrochemical cell does not rotate. Instead, a rolling sleeve is assembled over the rechargeable electrochemical cell. When the flexible display translates due to the first device housing and second device housing moving relative to each other, the rolling sleeve can translate around the rechargeable electrochemical cell. Non-cylindrical rechargeable electrochemical cells can be placed in a housing having a cylindrical exterior, as noted above. Other configurations will be described below. Still others will be obvious to those of ordinary skill in the art having the benefit of this disclosure.

Advantageously, embodiments of the disclosure provide an improved sliding mechanism for a flexible display in a sliding electronic device that eliminates the need for extra space housing a battery, as the rechargeable electrochemical cells defining the battery are placed within—or define—the rotor for the flexible display. Flexible display and rotor sliding assemblies configured in accordance with embodiments of the disclosure provide translation of a flat upper portion of the J-shape while preserving the operability and functionality of the flexible display during sliding operations. Embodiments of the disclosure additionally prevent the application of elevated mechanical strains and stresses to the various layers of the flexible display. When the sliding operation is cycled numerous times, these elevated mechanical strains and stresses can cause mechanical failure in one or more of the layers of the flexible display. Advantageously, embodiments of the disclosure prevent this from occurring.

In one or more embodiments, an electronic device includes a first device housing that is configured to slide relative to a second device housing between a closed position and an open position. A flexible display is coupled to the first device housing and the second device housing and translates along a translation surface defined by one or both of the first device housing and the second device housing.

In one or more embodiments, a flexible support structure is coupled to the flexible display between the flexible display and the translation surface. In one or more embodiments, the flexible support structure defines a plurality of engagement teeth along a first portion of the flexible support structure. In one or more embodiments, a rotor engages the first portion of the flexible support structure. In one or more embodiments, the rotor comprises—or is—a rechargeable electrochemical cell.

Turning now to FIG. 1, illustrated therein is one explanatory electronic device 100 configured in accordance with one or more embodiments of the disclosure. The electronic device 100 of FIG. 1 is a portable electronic device. For illustrative purposes, the electronic device 100 is shown as a smartphone. However, the electronic device 100 could be any number of other devices as well, including tablet computers, gaming devices, multimedia players, and so forth. Still other types of electronic devices can be configured in accordance with one or more embodiments of the disclosure as will be readily appreciated by those of ordinary skill in the art having the benefit of this disclosure.

The electronic device 100 includes a first device housing 101 and a second device housing 102. In one or more embodiments, the first device housing 101 slides relative to the second device housing 102. In the illustrative embodiment of FIG. 1, the first device housing 101 can selectively slide into, and out of, the second device housing 102. However, in other embodiments the opposite will be true, with the second device housing 102 being selectively slidable into and out of the first device housing 101.

In one or more embodiments, one of the first device housing 101 or second device housing 102 includes rails that couple to tracks in the other of the first device housing 101 or the second device housing 102. For instance, the first device housing 101 can have rails that couple to tracks in the second device housing 102. In another embodiment, the first device housing 101 may have a rail and a track, with the second device housing 102 having a complementary rail and track that engage the rail and track of the first device housing 101 to facilitate the sliding operation. Other techniques that allow the first device housing 101 and the second device housing 102 to slide relative to each other between a closed position (shown below in FIG. 3) and the open position of FIG. 1 will be obvious to those of ordinary skill in the art having the benefit of this disclosure.

In one or more embodiments the first device housing 101 and the second device housing 102 are manufactured from a rigid material such as a rigid thermoplastic, metal, or composite material, although other materials can be used. Illustrating by example, in one illustrative embodiment the first device housing 101 and the second device housing 102 are manufactured from aluminum. Still other constructs will be obvious to those of ordinary skill in the art having the benefit of this disclosure.

In the illustrative embodiment of FIG. 1, the electronic device 100 includes a single sliding mechanism where the first device housing 101 slides relative to the second device housing 102. However, in other embodiments two or more sliding mechanisms can be incorporated into the electronic device 100 to allow it to be slide at multiple locations, such as in a telescoping configuration.

This illustrative electronic device 100 of FIG. 1 includes a display. The display can optionally be touch-sensitive. Users can deliver user input to the display of such an embodiment by delivering touch input from a finger, stylus, or other objects disposed proximately with the display.

In one embodiment, the display is configured as an organic light emitting diode (OLED) display fabricated on a flexible plastic substrate, thereby making the display a flexible display 103. This allows the display to be flexible so as to deform around a display roller mechanism 104, one example of which is a rotor that includes, or is, a rechargeable electrochemical cell. When the first device housing 101 slides relative to the second device housing 102, the flexible display 103 translates along a translation surface of one of the first device housing 101 or the second device housing 102, and also curves around the rotor. When a flexible display 103 is used, in one or more embodiments an OLED is constructed on flexible plastic substrates can allow the flexible display 103 to bend with various bending radii around the display roller mechanism 104.

In one or more embodiments the flexible display 103 may be formed from multiple layers of flexible material such as flexible sheets of polymer or other materials. In this illustrative embodiment, the flexible display 103 is fixedly coupled to the first device housing 101 and extends into the second device housing 102 and around the display roller mechanism 104. The flexible display 103 spans the engagement line at which the first device housing 101 slides into, and out of, the second device housing 102 in this illustrative embodiment.

Features can be incorporated into the first device housing 101 and/or the second device housing 102. Examples of such features include a camera 105 or an optional speaker port 106, which are shown disposed on the rear side of the electronic device 100 in this embodiment but could be placed on the front side as well. In this illustrative embodiment, a user interface component 107, which may be a button, fingerprint sensor, or touch sensitive surface, can also be disposed along the rear side of the first device housing 101. As noted, any of these features are shown being disposed on the rear side of the electronic device 100 in this embodiment, but could be located elsewhere, such as on the front side in other embodiments. In other embodiments, these features may be omitted.

The electronic device 100 can optionally include at least a second display. Illustrating by example, in one embodiment the camera 105 and the user interface component 107 can be moved to the second device housing 102, with a second display being positioned where the camera 105 and user interface component 107 are positioned in FIG. 1. The second display could be coupled to the second device housing 102 as well. In still other embodiments, a second display can be coupled to the first device housing 101, while a third display (not shown) is coupled to the second device housing 102. Thus, electronic devices configured in accordance with embodiments of the disclosure can include displays situated at different positions.

A block diagram schematic 108 of the electronic device 100 is also shown in FIG. 1. The block diagram schematic 108 includes one or more electronic components that can be coupled to a printed circuit board assembly disposed within either or both of the first device housing 101 or the second device housing 102 of the electronic device 100. The components of the block diagram schematic 108 can be electrically coupled together by conductors or a bus disposed along one or more printed circuit boards, which can be flexible in some embodiments.

For example, some components of the block diagram schematic 108 can be configured as a first electronic circuit fixedly situated within the first device housing 101, while other components of the block diagram schematic 108 can be configured as a second electronic circuit fixedly situated within the second device housing 102. A flexible substrate can then extend from the first electronic circuit in the first device housing 101 to the second electronic circuit in the second device housing 102 to electrically couple the first electronic circuit to the second electronic circuit.

In one or more embodiments, the electronic device 100 includes one or more processors 109. In one embodiment, the one or more processors 109 can include an application processor and, optionally, one or more auxiliary processors. One or both of the application processor or the auxiliary processor(s) can include one or more processors. One or both of the application processor or the auxiliary processor(s) can be a microprocessor, a group of processing components, one or more ASICs, programmable logic, or other type of processing device.

The application processor and the auxiliary processor(s) can be operable with the various components of the electronic device 100. Each of the application processor and the auxiliary processor(s) can be configured to process and execute executable software code to perform the various functions of the electronic device 100. A storage device, such as memory 110, can optionally store the executable software code used by the one or more processors 109 during operation.

In this illustrative embodiment, the electronic device 100 also includes a communication circuit 111 that can be configured for wired or wireless communication with one or more other devices or networks. The networks can include a wide area network, a local area network, and/or personal area network. The communication circuit 111 may also utilize wireless technology for communication, such as, but are not limited to, peer-to-peer or ad hoc communications such as HomeRF, Bluetooth and IEEE 802.11, and other forms of wireless communication such as infrared technology. The communication circuit 111 can include wireless communication circuitry, one of a receiver, a transmitter, or transceiver, and one or more antennas 112.

In one embodiment, the one or more processors 109 can be responsible for performing the primary functions of the electronic device 100. For example, in one embodiment the one or more processors 109 comprise one or more circuits operable with one or more user interface devices, which can include the display, to present, images, video, or other presentation information 113 to a user. The executable software code used by the one or more processors 109 can be configured as one or more modules 114 that are operable with the one or more processors 109. Such modules 114 can store instructions, control algorithms, logic steps, and so forth.

In one embodiment, the one or more processors 109 are responsible for running the operating system environment of the electronic device 100. The operating system environment can include a kernel and one or more drivers, and an application service layer, and an application layer. The operating system environment can be configured as executable code operating on one or more processors or control circuits of the electronic device 100. The application layer can be responsible for executing application service modules. The application service modules may support one or more applications or "apps." The applications of the application layer can be configured as clients of the application service layer to communicate with services through application program interfaces (APIs), messages, events, or other inter-process communication interfaces. Where auxiliary processors are used, they can be used to execute input/output functions, actuate user feedback devices, and so forth.

In one embodiment, the one or more processors 109 may generate commands or execute control operations based on information received from the sensors 115 of the electronic device 100. The one or more processors 109 may also generate commands or execute control operations based upon information received from a combination of the one or more sensors 115, the flexible display 103, and/or the other input devices such as the user interface component 107. Alternatively, the one or more processors 109 can generate commands or execute control operations based upon information received from the one or more sensors 115 or the flexible display 103 alone. Moreover, the one or more processors 109 may process the received information alone or in combination with other data, such as the information stored in the memory 110.

The one or more sensors 115 may include a microphone, an earpiece speaker, a second loudspeaker (disposed beneath speaker port 106), and a user interface component 107 such as a button or touch-sensitive surface. The one or more other sensors 115 may also include key selection sensors, proximity sensors, a touch pad sensor, a touch screen sensor, a capacitive touch sensor, and one or more switches. Touch sensors may used to indicate whether any of the user actuation targets present on the display are being actuated. Alternatively, touch sensors disposed in the electronic device 100 can be used to determine whether the electronic device 100 is being touched at side edges or major faces of the first device housing 101 or the second device housing 102. The touch sensors can include surface and/or housing capacitive sensors in one embodiment. The other sensors 115 can also include audio sensors and video sensors (such as the camera 105).

The other sensors 115 can also include motion detectors, such as one or more accelerometers or gyroscopes. For example, an accelerometer may be embedded in the electronic circuitry of the electronic device 100 to show vertical orientation, constant tilt and/or whether the electronic device 100 is stationary. A gyroscope can be used in a similar fashion.

Other components 116 operable with the one or more processors 109 can include output components such as video outputs, audio outputs, and/or mechanical outputs. Examples of output components include audio outputs such as speaker port 106, earpiece speaker, or other alarms and/or buzzers and/or a mechanical output component such as vibrating or motion-based mechanisms. Still other components will be obvious to those of ordinary skill in the art having the benefit of this disclosure.

In one or more embodiments, a mechanical support structure 117 is coupled to the flexible display 103. The mechanical support structure 117 can be configured as a mechanical chassis that allows the flexible display 103 to translate along a translation surface of one or both of the first device housing 101 and/or the second device housing 102 when the first device housing 101 translates relative to the second device housing 102, thereby causing the display roller mechanism 104 to rotate.

The mechanical support structure 117 can include a flexible support structure 118 positioned between the flexible display 103 and the translation surface. The mechanical support structure 117 can further include a support layer 119 positioned between a portion of the flexible display 103 and the translation surface.

In one or more embodiments, the support layer 119 is configured as a rigid, substantially planar support layer that abuts the translation surface both when the electronic device 100 is in the open position or in the closed position. In one or more embodiments, the support layer 119 is a portion of one of either the first device housing 101 or the second device housing 102. Illustrating by example, if the display roller mechanism 104 is situated in the second device housing 102, the support layer 119 can be a portion of, or fixedly coupled to, the first device housing 101. When the display roller mechanism causes the support layer 119 to translate along the translation surface defined by the second device housing 102, this action can cause the first device housing 101 to slide toward, or away from, the second device housing as well. Accordingly, in one or more embodiments an offset between the first device housing 101 and the second device housing is created by engagement of the support layer 119 and the translation surface.

In one or more embodiments, some portions of the flexible support structure 118 abut the translation surface while other portions abut the display roller mechanism 104. Still other portions of the flexible support structure 118 abut the support layer 119, where included. This will be illustrated in more detail in FIGS. 14-15 below.

In one or more embodiments, the mechanical support structure 117 is positioned between the flexible display 103 and the translation surface. The mechanical support structure 117 can be fixedly coupled to the flexible display 103 by an adhesive or other coupling mechanism. Where the mechanical support structure 117 includes a flexible support structure 118, the flexible support structure 118 can define a first section extending from the flexible display 103 to the translation surface and a second section extending from the flexible display 103 to the support layer 119.

In one or more embodiments, the first section of the flexible support structure 118 defines a plurality of engagement teeth. In one or more embodiments, some engagement teeth of the plurality of engagement teeth abut the translation surface, while some other engagement teeth abut the rotor. In one or more embodiments, the second section of the flexible support structure 118 extending from the flexible display 103 to the support layer 119 is devoid of engagement teeth. This too will be illustrated in more detail in FIGS. 14-15 below.

Since the display roller mechanism 104 can be—or can comprise—a rechargeable electrochemical cell, in one or more embodiments an optional regenerative charging circuit 120 can be included. In one or more embodiments, the regenerative charging circuit 120 is driven when the first device housing 101 and the second device housing 102 slide toward, or away from, each other. In one or more embodiments, the regenerative charging circuit 120 is configured to deliver a charging current to the rechargeable electrochemical cell of the display roller mechanism 104 when the first device housing 101 and second device housing 102 slide relative to each other.

It is to be understood that FIG. 1 is provided for illustrative purposes only and for illustrating components of one electronic device 100 in accordance with embodiments of the disclosure and is not intended to be a complete schematic diagram of the various components required for an electronic device. Therefore, other electronic devices in accordance with embodiments of the disclosure may include various other components not shown in FIG. 1 or may include a combination of two or more components or a division of a particular component into two or more separate components, and still be within the scope of the present disclosure.

Turning now to FIG. 2, illustrated therein is the electronic device 100 in an open position 200. In the axially displaced open position 200, the first device housing 101 slides out of the second device housing 102, thereby revealing the flexible display 103. In such a configuration, the first device housing 101 and the second device housing 102 effectively define a plane. Since this illustrative embodiment includes a flexible display 103, the flexible display 103 has been elongated into a flat position.

Figure 3:
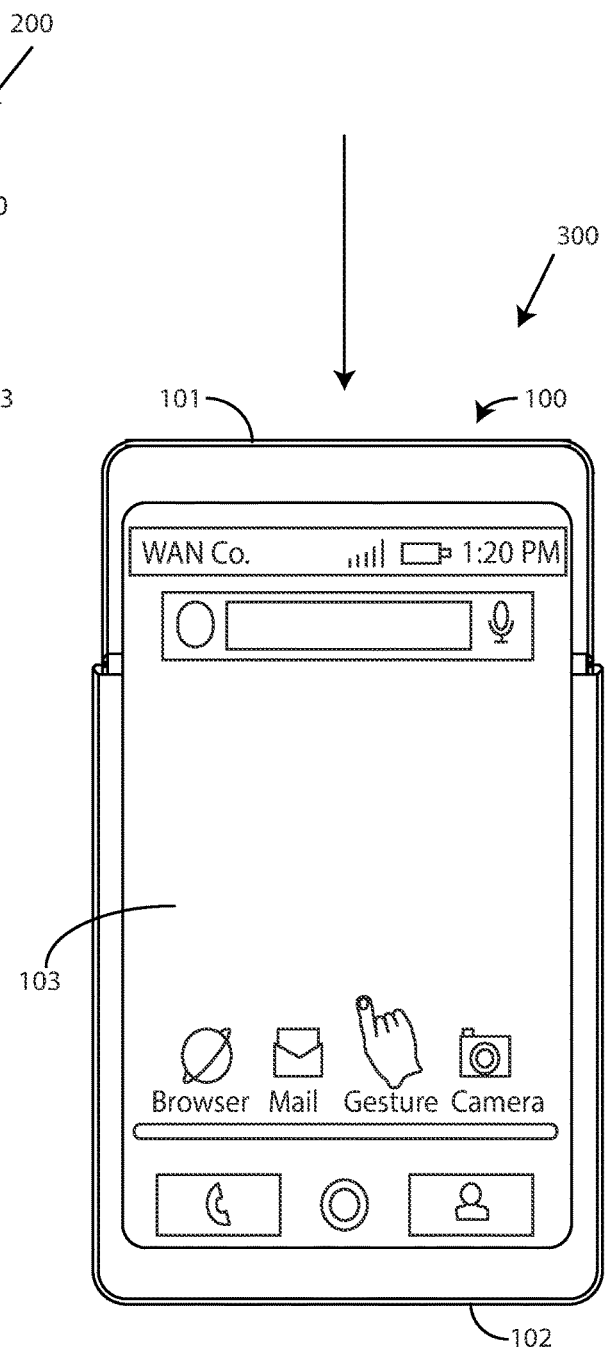
FIG. 3 illustrates one explanatory sliding electronic device in a closed position.

Turning now to FIG. 3, illustrated therein is the electronic device 100 in a closed state. In this state, the first device housing 101 slides 301 into the second device housing 102 toward the second device housing 102 to a closed position 300. This causes the overall length of the electronic device 100 to get shorter. Additionally, the flexible display 103 inserts into the second device housing 102 by passing around the display roller mechanism (104) and becoming concealed within the second device housing 102. When the electronic device 100 opens again, the concealed portions of the flexible display 103 are again revealed.

In some embodiments, features can be included to further retain the electronic device 100 in the closed position 300. Illustrating by example, in another embodiment, a mechanical latch can be included to retain the first device housing 101 and the second device housing 102 in the closed position 300. In still another embodiment, magnets can be incorporated into the first device housing 101 and the second device housing 102. For instance, magnets can be placed in the first device housing 101 and the second device housing 102 to retain the first device housing 101 and the second device housing 102 in the closed position 300.

In still other embodiments, frictional elements can be incorporated into the mechanical interface existing between the first device housing 101 and the second device housing 102 to retain the first device housing 101 and the second device housing 102 in a particular position. A stator motor could be integrated into electronic device 100 to drive the first device housing 101 and second device housing 102 together and apart as well. Still other mechanical structures and devices suitable for retaining the electronic device 100 in the closed position 300 will be obvious to those of ordinary skill in the art having the benefit of this disclosure.

Figure 4:
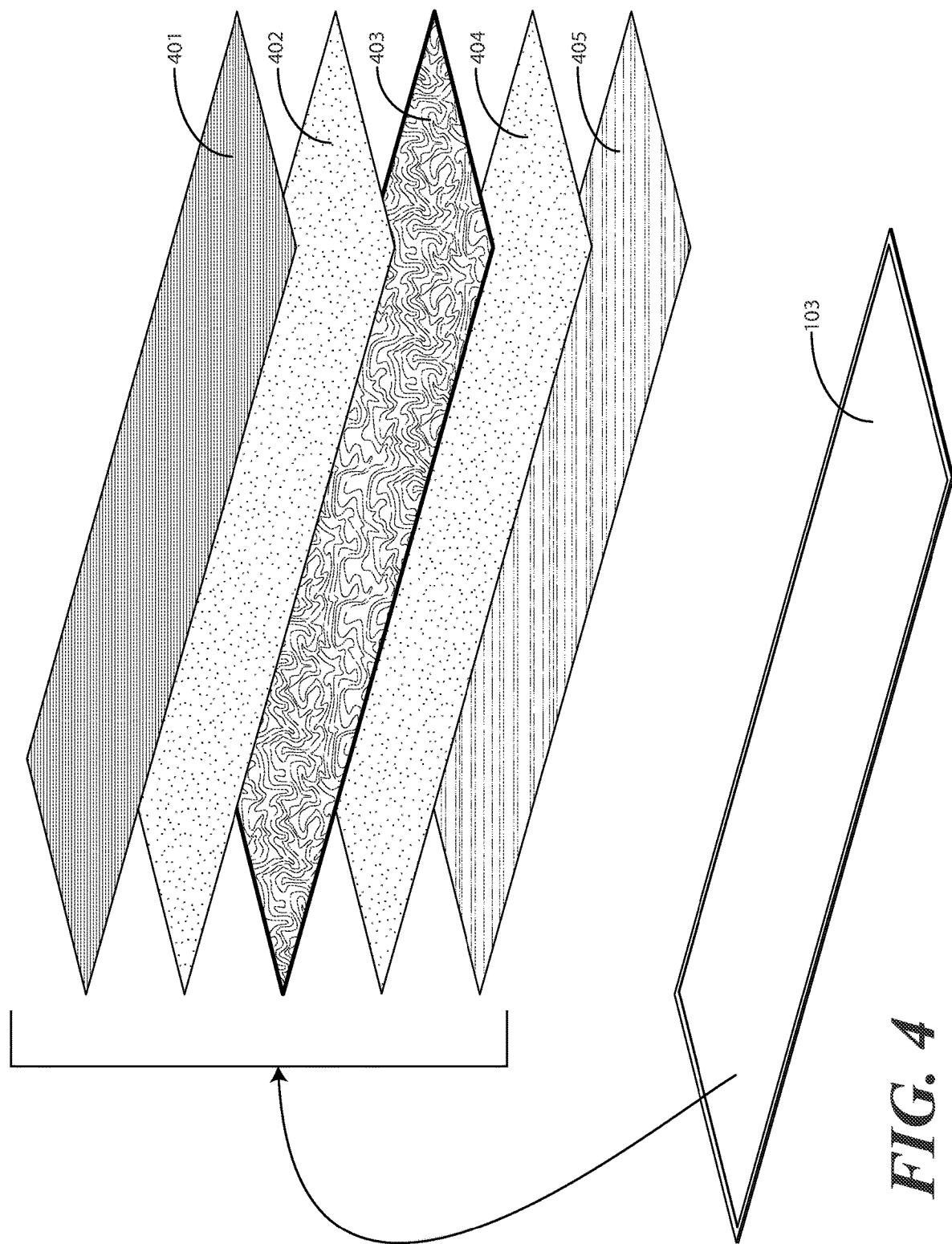
FIG. 4 illustrates an exploded view of one explanatory flexible display in accordance with one or more embodiments of the disclosure.

Turning now to FIG. 4, illustrated therein is one example of a flexible display 103 configured in accordance with one or more embodiments of the disclosure. As shown in FIG. 4, in one or more embodiments the flexible display 103 comprises one or more layers that are coupled or laminated together to complete the flexible display 103. In one or more embodiments, these layers comprise a flexible protective cover 401, a first adhesive layer 402, a flexible display layer 403, a second adhesive layer 404, and a flexible substrate 405. Other configurations of layers suitable for manufacturing the flexible display 103 will be obvious to those of ordinary skill in the art having the benefit of this disclosure.

Beginning from the top of the layer stack, in one or more embodiments the flexible protective cover 401 comprises an optically transparent substrate. In one or more embodiments the flexible protective cover 401 may be manufactured from an optically transparent material such a thin film sheet of a thermoplastic material. Illustrating by example, in one embodiment the flexible protective cover 401 is manufactured from a layer of optically transparent polyamide having a thickness of about eighty microns. In another embodiment, the flexible protective cover 401 is manufactured from a layer of optically transparent polycarbonate having a thickness of about eighty microns. Other materials suitable for manufacturing the flexible protective cover 401 will be obvious to those of ordinary skill in the art having the benefit of this disclosure.

In one or more embodiments the flexible protective cover 401 functions as a fascia by defining a cover for the flexible display layer 403. In one or more embodiments the flexible protective cover 401 is optically transparent, in that light can pass through the flexible protective cover 401 so that objects behind the flexible protective cover 401 can be distinctly seen. The flexible protective cover 401 may optionally include an ultra-violet barrier. Such a barrier can be useful in improving the visibility of flexible display layer 403 in one or more embodiments.

Beneath the flexible protective cover 401 is a first adhesive layer 402. In one or more embodiments, the first adhesive layer 402 comprises an optically transparent adhesive. The optically transparent adhesive can be applied to two sides of a thin, optically transparent substrate such that the first adhesive layer 402 functions as an optically transparent layer having optically transparent adhesive on both sides. Where so configured, in one or more embodiments the first adhesive layer 402 has a thickness of about fifty microns. This optically transparent version of "double-sided tape" can then be spooled and applied between the flexible protective cover 401 and the flexible display layer 403 to couple the two together.

In other embodiments the first adhesive layer 402 will instead be applied between the flexible protective cover 401 and the flexible display layer 403 as an optically transparent liquid, gel, as a homogeneous adhesive layer, or in the form of another medium. Where so configured, the first adhesive layer 402 can optionally be cured by heat, ultraviolet light, or other techniques. Other examples of materials suitable for use as the first adhesive layer 402 will be obvious to those of ordinary skill in the art having the benefit of this disclosure. In one or more embodiments, the first adhesive layer 402 mechanically couples the flexible display layer 403 to the flexible protective cover 401.

In one or more embodiments, the flexible display layer 403 is situated between the flexible substrate 405 and the flexible protective cover 401. In other embodiments, a layer above the flexible display layer 403 can be configured with enough stiffness to make the flexible substrate 405 unnecessary. For example, in an embodiment where the flexible protective cover 401 is configured with enough stiffness to retain the flexible display 103 in the proper shape, the flexible substrate 405 may be omitted.

The flexible display layer 403 can optionally be touch-sensitive. In one or more embodiments, the flexible display layer 403 is configured as an organic light emitting diode (OLED) display layer coupled to the flexible substrate 405, which allows the flexible display layer 403 to bend in accordance with various bending radii. For example, some embodiments allow bending radii of between thirty and six hundred millimeters. Other substrates allow bending radii of around five millimeters to provide a display that is foldable through active bending. Other displays can be configured to accommodate both bends and folds.

In one or more embodiments the flexible display layer 403 may be formed from multiple layers of flexible material such as flexible sheets of polymer or other materials. Illustrating by example, the flexible display layer 403 can include a layer of optically pellucid electrical conductors, a polarizer layer, one or more optically transparent substrates, and layers of electronic control circuitry such as thin film transistors to actuate pixels and one or more capacitors for energy storage. In one or more embodiments, the flexible display layer 403 has a thickness of about 130 microns.

In one or more embodiments, so as to be touch sensitive, the flexible display layer 403 includes a layer including one or more optically transparent electrodes. In one or more embodiments, the flexible display layer 403 includes an organic light emitting diode layer configured to images and other information to a user. The organic light emitting diode layer can include one or more pixel structures arranged in an array, with each pixel structure comprising a plurality of electroluminescent elements such as organic light emitting diodes. These various layers can be coupled to one or more optically transparent substrates of the flexible display layer 403. Other layers suitable for inclusion with the flexible display layer 403 will be obvious to those of ordinary skill in the art having the benefit of this disclosure.

In one or more embodiments, the flexible display layer 403 is coupled to the flexible substrate 405 by a second adhesive layer 404. In one or more embodiments, to simplify manufacture, the second adhesive layer 404 is identical to the first adhesive layer 402 and comprises an optically transparent adhesive. However, since the second adhesive layer 404 is coupled between the flexible display layer 403 and the flexible substrate 405, i.e., under the flexible display layer 403, an optically transparent adhesive is not a requirement. The second adhesive layer 404 could be partially optically transparent or not optically transparent at all in other embodiments.

Regardless of whether the second adhesive layer 404 is optically transparent, in one or more embodiments the adhesive of the second adhesive layer 404 is applied to two sides of a thin, flexible substrate. Where so configured, in one or more embodiments the second adhesive layer 404 has a thickness of about fifty microns. This extremely thin version of "double-sided tape" can then be spooled and applied between the flexible display layer 403 and the flexible substrate 405 to couple the two together.

In other embodiments, as with the first adhesive layer 402, the second adhesive layer 404 will instead be applied between the flexible display layer 403 and the foldable substrate as a liquid, gel, as a homogeneous layer, or in the form of another medium. Where so configured, the second adhesive layer 404 can optionally be cured by heat, ultraviolet light, or other techniques. Other examples of materials suitable for use as the second adhesive layer 404 will be obvious to those of ordinary skill in the art having the benefit of this disclosure.

In one or more embodiments, the flexible display 103 comprises a flexible substrate 405. In one or more embodiments the flexible substrate is coupled to the flexible display layer 403 and defines a mechanical support for the flexible display layer 403 due to the fact that the flexible substrate 405 is the stiffest layer of the flexible display 103. In one or more embodiments the flexible substrate 405 is manufactured from stainless steel with a thickness of about forty microns. In another embodiment, the flexible substrate 405 is manufactured from a flexible plastic. Other materials from which the flexible substrate 405 can be manufactured will be obvious to those of ordinary skill in the art having the benefit of this disclosure.

In one or more embodiments, the various layers of the flexible display 103 are laminated together in a substantially planar configuration. Said differently, in one or more embodiments the flexible substrate 405 is configured as a substantially planar substrate. The second adhesive layer 404 can be attached to this substantially planar substrate, with the flexible display layer 403 then attached to the second adhesive layer 404. The first adhesive layer 402 can be attached to the flexible display layer 403, with the flexible protective cover 401 attached to the first adhesive layer 402. To ensure proper coupling, the resulting flexible display layer 403 can be cured, such as in an autoclave at a predefined temperature for a predefined duration. Where employed, such curing allows any air bubbles or other imperfections in the various layers to be corrected. In one or more embodiments, since the flexible substrate 405 is configured as a substantially planar substrate, the resulting flexible display 103 is substantially planar as well.

Figure 5:
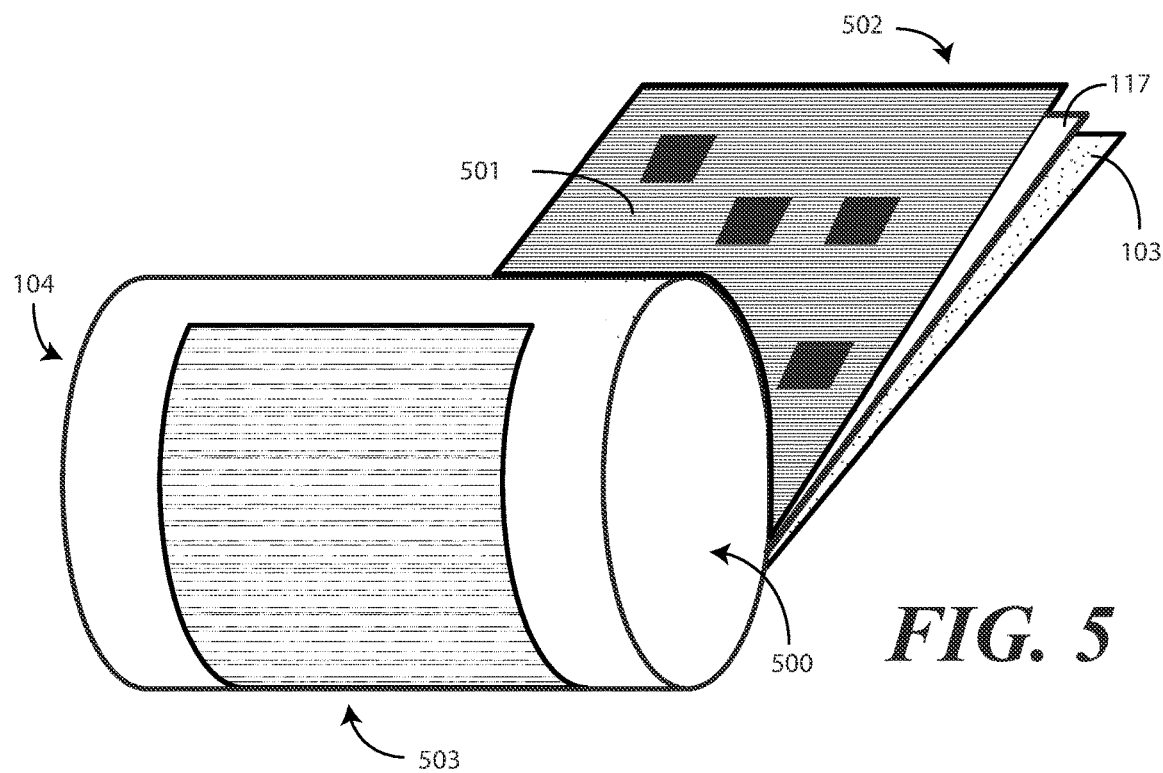
FIG. 5 illustrates one explanatory flexible display and rotor assembly configured in accordance with one or more embodiments of the disclosure.

Turning now to FIG. 5, illustrated therein is one explanatory display assembly configured for a sliding electronic device in accordance with one or more embodiments of the disclosure. As described above, in one or more embodiments a display roller mechanism 104 is coupled to the flexible display 103. In one or more embodiments, the display roller mechanism 104 comprises a rechargeable electrochemical cell. Illustrating by example, in one or more embodiments the display roller mechanism 104 is a rechargeable electrochemical cell. In other embodiments, the display roller mechanism 104 comprises a rechargeable electrochemical cell surrounded by a rotating sheath. In still other embodiments, the display roller mechanism 104 comprises a rechargeable electrochemical cell situated within a housing. Examples of each will be described below with reference to FIGS. 6-10.

In one or more embodiments, a flexible substrate 501 can be coupled to the display roller mechanism 104. In one or more embodiments, one or more electrical components (such as those included with the block diagram schematic 108) described above with reference to FIG. 1 can be coupled to the flexible substrate 501. In one or more embodiments, these electrical components are powered by the regenerative charging circuit of the display roller mechanism 104. So that the flexible substrate 501 need not electrically couple to ends of the display roller mechanism 104, in one or more embodiments the flexible substrate 501 includes electrical contacts that couple to a major surface of the display roller mechanism 104. Where this is the case, the flexible substrate 501 can translate within the electronic device (100) when the flexible display 103 translates across the translation surface of the electronic device (100) by an amount that is equal to, or greater than another amount that the flexible display 103 translates across the translation surface. The flexible substrate 501 can optionally wrap around the display roller mechanism 104, as shown in FIG. 5. Alternatively, it can be coupled to an end 502 of the flexible display 103 to expand and contract with extension and retraction of the flexible display 103 without wrapping about the display roller mechanism 104. Other configurations for the flexible substrate 501 will be obvious to those of ordinary skill in the art having the benefit of this disclosure.

In one or more embodiments a mechanical support structure 117 is fixedly coupled to the entirety of the flexible display 103. The mechanical support structure 117 serves as a mechanical chassis that allows the flexible display 103 to translate along a translation surface of a device housing of an electronic device configured as a sliding electronic device.

In the illustrative embodiment of FIG. 5, the flexible display 103 and flexible substrate 501 wrap around a display roller mechanism 104. Where included, the mechanical support structure 117 can wrap about the display roller mechanism 104 as well. In this illustrative embodiment, the display roller mechanism 104 includes a rotor 500 that is positioned within a curvilinear section 503 of the flexible display 103. When placed within a device housing of a sliding electronic device, rotation of the rotor 500 causes a linear translation of the flexible display 103 and optionally the flexible substrate 501 and/or mechanical support structure 117 across a translation surface of the device housing by drawing the flexible display 103 around the rotor 500. In one or more embodiments, the mechanical support structure 117 functions as a support substrate positioned between the curvilinear section 503 of the flexible display 103 and the rotor 500.

In one or more embodiments, the rotor 500 rotates with translation of the first device housing 101 across a translation surface of an electronic device. In one or more embodiments, the rotor 500 is a rechargeable electrochemical cell. In another embodiment, the rotor 500 comprises a rechargeable electrochemical cell surrounded by a sheath, with the sheath rotating in response to translation of the flexible display across the translation surface. In still another embodiment, the rotor 500 comprises a rechargeable electrochemical cell positioned within a housing defining an outer surface of the rotor 500, with the rotor 500 rotating with translation of the flexible display across the translation surface. Examples of each will now be described below with reference to FIGS. 6-10.

Figure 6:
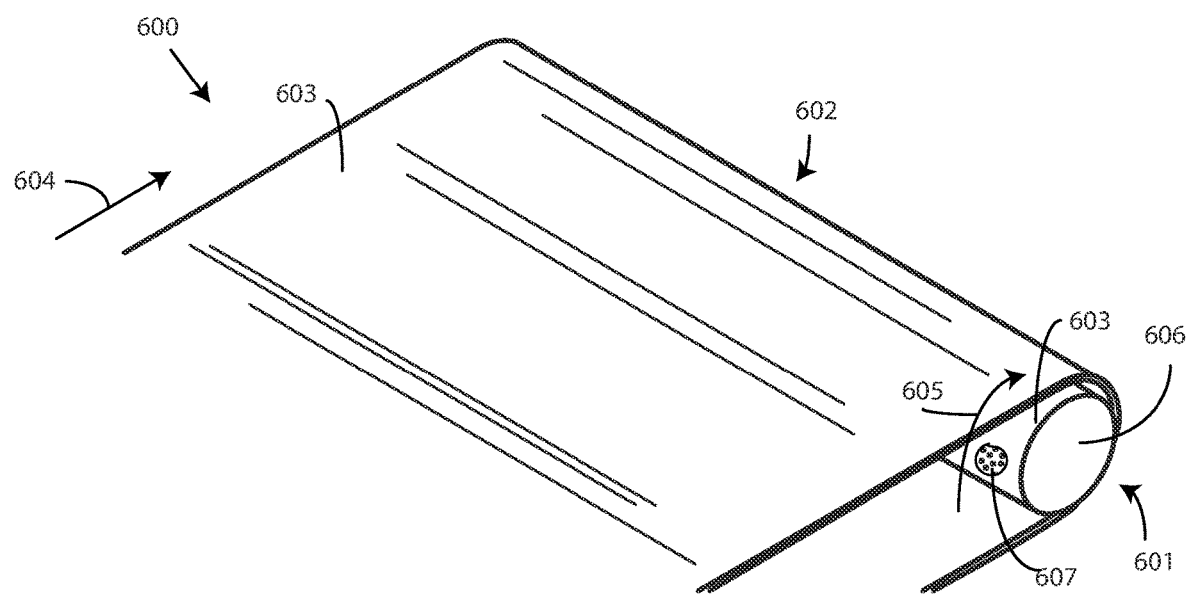
FIG. 6 illustrates another explanatory flexible display and rotor assembly configured in accordance with one or more embodiments of the disclosure.

Beginning with FIG. 6, illustrated therein is an assembly 600 for an electronic device (100) that includes a first device housing (101) and a second device housing (102) that are configured to slide relative to each other. As shown, a rotor 601 is positioned within a curvilinear section 602 of a flexible display 603. As the flexible display 603 translates 604, such as along a translation surface of a device housing of an electronic device, one example of which will be described below with reference to FIGS. 14-15, the rotor 601 rotates 605.

In this illustrative embodiment, the rotor 601 is a rechargeable electrochemical cell 606. In one or more embodiments, the rechargeable electrochemical cell 606 includes a positive electrode (cathode), a negative electrode (anode), and a separator that prevents these two electrodes from touching. While a separator electrically separates the cathode and anode, the separator permits ions to pass through.

In one or more embodiments, a separator having a top and bottom is placed atop an electrode. Disposed on the top of the separator is a first layer of an electrochemically active material. For example, the first layer may be lithium or a lithium intercalation material if the rechargeable electrochemical cell 606 is a lithium ion or lithium polymer cell.

Disposed atop first layer is a current collecting layer. The current collecting layer may be fabricated of any of a number of metals or alloys known in the art. Examples of such metals or alloys include, for example, nickel, aluminum, copper, steel, nickel plated steel, magnesium doped aluminum, and so forth. Disposed atop the current collection layer is a second layer of electrochemically active material.

The rechargeable electrochemical cell 606 stores and delivers energy by transferring ions between electrodes through a separator. For example, during discharge, an electrochemical reaction occurs between electrodes. This electrochemical reaction results in ion transfer through the separator, which causes electrons to collect at the negative terminal of the cell. When connected to a load, such as the electronic components of the block diagram schematic (108) of FIG. 1, the electrons flow from the negative pole through the circuitry in the load to the positive terminal of the cell. This is shown in conventional circuit diagrams as current flowing from the cathode to the anode.

When the rechargeable electrochemical cell 606 is charged, the opposite process occurs. Thus, to power electronic devices such as the electronic device (100) of FIG. 1, these electrons must be delivered from the cell to the electronic device (100). This is generally accomplished by coupling conductors, such as conductive foil strips, sometimes referred to colloquially as "electrical tabs" to the various layers.

This electrode construct can then be stacked. Once stacked, the electrode stack can be rolled into a "jellyroll" configuration so that the same can be placed in a cylindrical can 607 that defines the exterior surface of the rotor 601. Illustrating by example, two electrodes constructed as described above can be stacked, with one electrode fabricated with a layer of active electrode material, such as an electrochemically active negative electrode material, while the other electrode is fabricated with a layer of electrochemically active positive electrode material.

A first tab can be coupled to one electrode, while a second tab is coupled to the other electrode. These tabs can be coupled to the current collectors of each electrode.

In one or more embodiments, the electrodes are arranged in stacked relationship, with the tabs being disposed on opposite edges of the stack. Thereafter, the stack is rolled into a roll, sometimes referred to as a "jellyroll," for a subsequent insertion into an electrochemical cell housing such as the cylindrical can 607 of FIG. 6. The cylindrical can 607 can be a metal can or a plastic can. It can also be a flexible pouch, such as would be the case where the electrode assembly was a prismatic electrode assembly. Where metal or plastic, the housing can be configured to be cylindrical such that the rechargeable electrochemical cell 606 functions as a rotor 601. However, in other constructs the rechargeable electrochemical cell can be rectangular or ovular in cross section. Where non-cylindrical such rechargeable electrochemical cells generally are used with an exterior housing component, such as will be described below with reference to FIG. 8.

When the electrodes are rolled, one tab will end up substantially in the center of the roll, while the other tab will end up generally on the periphery of the roll. When the roll is placed in the cylindrical can 607 housing, this results in one tab being be centrally disposed within the cylindrical can 607, while the other tab is disposed peripherally within the cylindrical can 607.

These tabs can be routed different ways within the cylindrical can 607. Illustrating by example, turning briefly to FIG. 13, in one or more embodiments one tab is routed to the right end 1301 of the cylindrical can 607, which serves as one external electrode 1302 for the rechargeable electrochemical cell 606. Meanwhile, the other tab is routed to the left end 1303 of the cylindrical can 607, which serves as the other external electrode 1304 for the rechargeable electrochemical cell 606. This construct, which is used in FIG. 6, works well when the rechargeable electrochemical cell 606 is used as a rotor in that one electrical contact can be biased against the first external electrode 1302 on the right end 1301 of the rechargeable electrochemical cell 606, while another electrical contact is biased against the second electrode 1304 on the left end 1303 of the rechargeable electrochemical cell 606. The rechargeable electrochemical cell 606 can then rotate (605) as the flexible display (603) translates (604) with each electrical contact remaining stationary and biased against a single location of first external electrode 1302 on the right end 1301 of the rechargeable electrochemical cell 606 and the second electrode 1304 on the left end 1303 of the rechargeable electrochemical cell 606, respectively.

Figure 11:
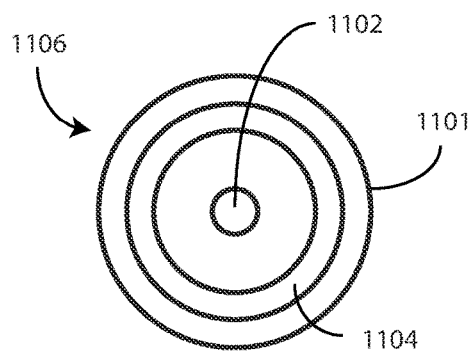
FIG. 11 illustrates an end of one explanatory rechargeable electrochemical cell configured in accordance with one or more embodiments of the disclosure.

In other embodiments, however, both tabs can be routed to one end of the rechargeable electrochemical cell. Turning now to FIG. 11, illustrated therein is another rechargeable electrochemical cell 1106 having a first external electrode 1102 and a second external electrode 1104 positioned on the same end 1101 of the rechargeable electrochemical cell 1106. In this illustrative embodiment, the first external electrode 1102 and the second external electrode 1104 are concentrically aligned. This allows the rechargeable electrochemical cell 1106 of FIG. 11 to be used in the assembly (600) of FIG. 6 as well. One electrical contact can be biased against the first external electrode 1102 while another electrical contact is biased against the second electrode 1104. The rechargeable electrochemical cell 1106 can then rotate (605) as the flexible display (603) translates (604) with each electrical contact remaining stationary and biased against a single location of first external electrode 1102 and the second electrode 1104, respectively.

Figure 12:
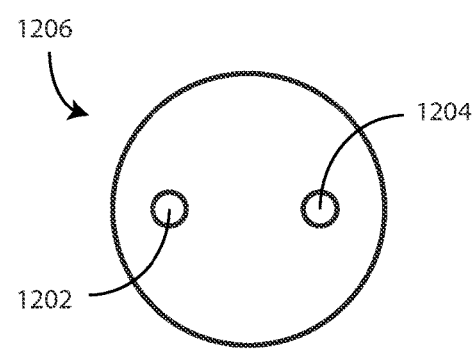
FIG. 12 illustrates an end of another explanatory rechargeable electrochemical cell configured in accordance with one or more embodiments of the disclosure.

Turning now to FIG. 12, illustrated therein is still another rechargeable electrochemical cell 1206 having both tabs routed to a single end of the rechargeable electrochemical cell 1206. Here, a first external electrode 1202 and a second external electrode 1204 are positioned on the same end 1201 of the rechargeable electrochemical cell 1206. In this illustrative embodiment, the first external electrode 1202 and the second external electrode 1204 are arranged in a line. While this arrangement of external electrodes complicates things from an electrical contact perspective when the rechargeable electrochemical cell 1206 rotates, embodiments of the disclosure contemplate other configurations where a sheath or other component is positioned about the exterior of the rechargeable electrochemical cell 1206, with that component rotating while the rechargeable electrochemical cell 1206 remains stationary. Such an embodiment will be described below with reference to FIG. 7. The rechargeable electrochemical cell 1206 of FIG. 12, as well as the rechargeable electrochemical cells (1106,1306) of FIGS. 11 and 13, could be used in that embodiment to be sure.

Figure 13:
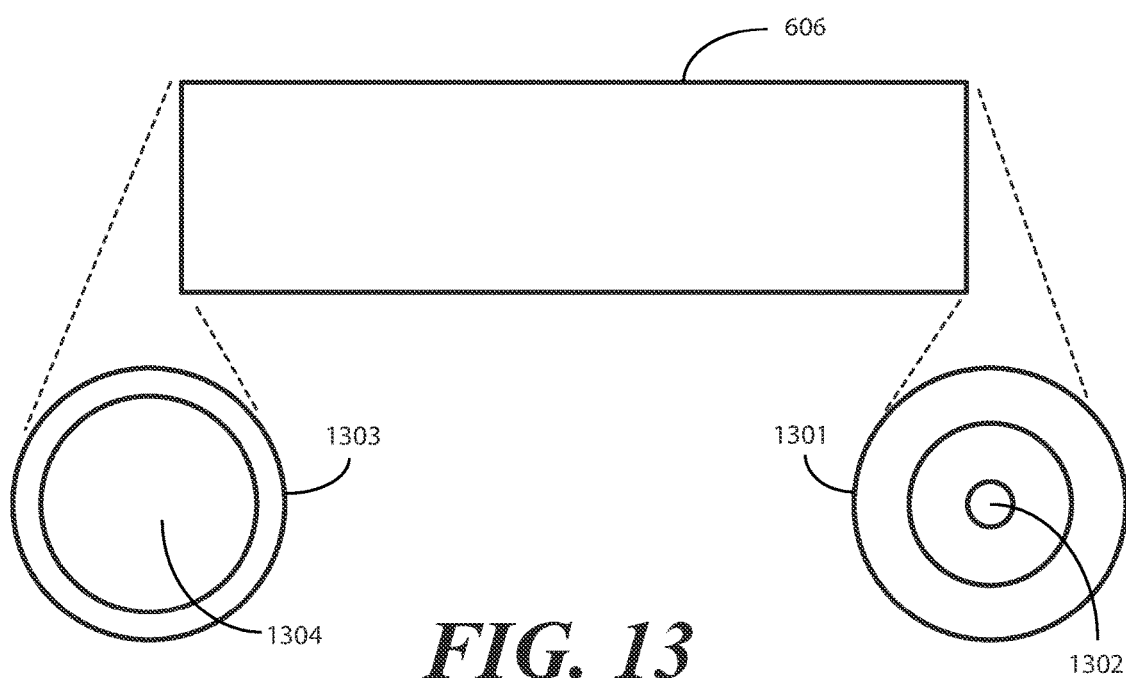
FIG. 13 illustrates still another explanatory rechargeable electrochemical cell configured in accordance with one or more embodiments of the disclosure.

For the rechargeable electrochemical cells 606,1106,1206 of FIGS. 11-13, the cylindrical cans can be sealed in a variety of ways. In one illustrative embodiment, the cylindrical cans can be sealed by a lid defining each end of the cylindrical can. The lids, which can be manufactured from metal, are connected to the internal tabs and serve as one electrical terminal of the rechargeable electrochemical cells 606,1106,1206. An insulator can be provided to isolate the lid from the other tab. The second tab can be the coupled to another location, be it the left end 1303 of FIG. 13, the outer, concentrically aligned external electrode 1104 of FIG. 11, or the second external electrode 1204 of FIG. 12. In other embodiments, such as when the cylindrical cans are manufactured from aluminum, the cylindrical can itself can be connected to the cathode. Conversely, where the cylindrical can is manufactured from steel, it will be connected to the anode.

In alternate embodiments, the tabs can be connected to a terminal block rather than to the lid and housing. The end 1201 of FIG. 12 could comprise a terminal block, for example. The terminal block, where employed, provides a convenient way for both the positive terminal and negative terminal to reside on a common end of the rechargeable electrochemical cell 1206.

Turning now back to FIG. 6, in one or more embodiments coatings, wraps, overlays, or other components can be applied the cylindrical can 607 when the rechargeable electrochemical cell 606 is used as a rotor 601. Illustrating by example, embodiments of the disclosure contemplate that when the cylindrical can 607 is manufactured from metal, it may have a low coefficient of friction. Slippage of the flexible display 603 across the exterior of the cylindrical can 607 may undesirably cause mechanical wear to the inner layers of the flexible display 603. Accordingly, in one or more embodiments a friction increasing coating 608 can be applied to an outer surface of the cylindrical can 607 to ensure that the rechargeable electrochemical cell 606 rotates 605 when the flexible display 603 translates. Examples of friction increasing coatings 608 include coatings comprising elastomeric components such as silicone, rubber, or elastomers. Friction increasing coatings 608 can also include ceramic, nickel, or diamond particles that increase the coefficient of friction of the outer surface of the cylindrical can 607. Other examples of friction increasing coatings 608 will be obvious to those of ordinary skill in the art having the benefit of this disclosure.

Figure 7:
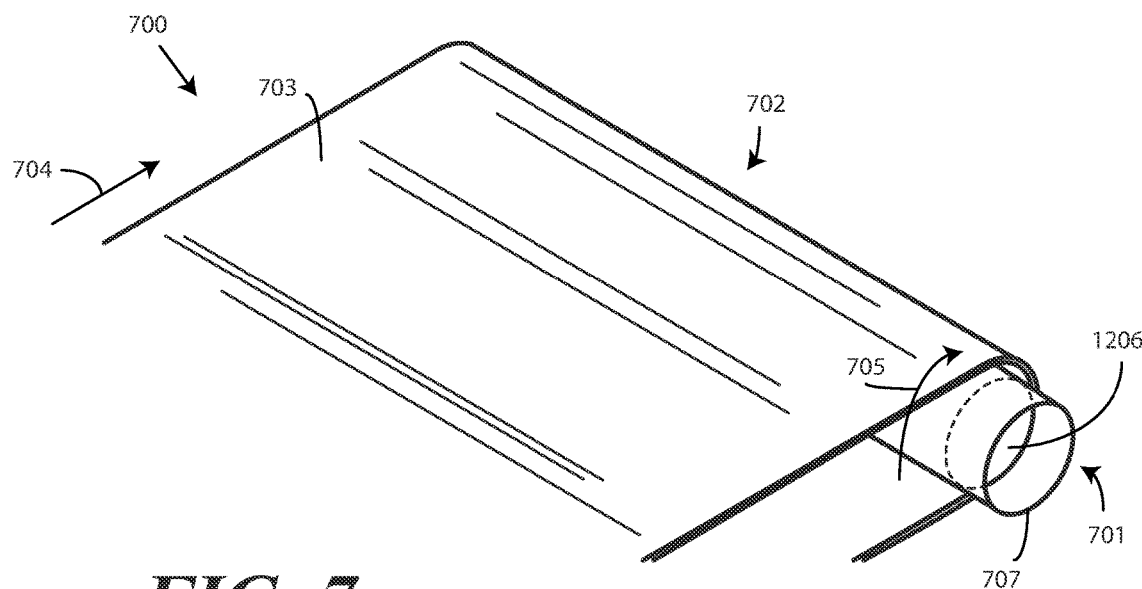
FIG. 7 illustrates yet another explanatory flexible display and rotor assembly configured in accordance with one or more embodiments of the disclosure.

Turning now to FIG. 7, illustrated therein is another assembly 700 for an electronic device (100) that includes a first device housing (101) and a second device housing (102) that are configured to slide relative to each other. Once again, a rotor 701 is positioned within a curvilinear section 702 of a flexible display 703. In this illustrative embodiment, the rotor 701 comprises a rechargeable electrochemical cell, one example of which is the rechargeable electrochemical cell 1206 of FIG. 12. However, rather than rotating (605) as the rechargeable electrochemical cell (606) of FIG. 6 did when the flexible display (603) translates (604), in the illustrative embodiment of FIG. 7 the rechargeable electrochemical cell 1206 stay stationary. Instead, a sheath 707 is positioned about an exterior of the cylindrical can of the rechargeable electrochemical cell 1206 such that the sheath 707 surrounds the exterior major surface of the cylindrical can. In this embodiment, when the flexible display 703 translates 704, such as along a translation surface of a device housing of an electronic device, the sheath 707 rotates 705 while the rechargeable electrochemical cell 1206 stay stationary.

Figure 8:
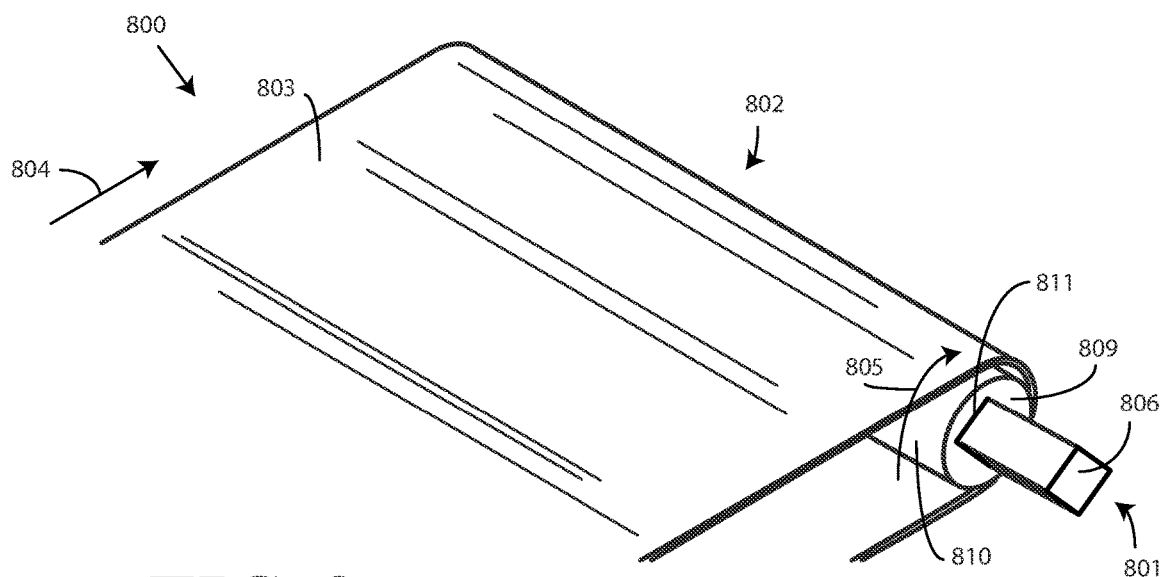
FIG. 8 illustrates still another explanatory flexible display and rotor assembly configured in accordance with one or more embodiments of the disclosure.

Turning now to FIG. 8, illustrated therein is yet another assembly 800 for an electronic device (100) that includes a first device housing (101) and a second device housing (102) that are configured to slide relative to each other. As before, a rotor 801 is positioned within a curvilinear section 802 of a flexible display 803. In this illustrative embodiment, the rotor 801 again comprises a rechargeable electrochemical cell 806. However, here the rechargeable electrochemical cell 806 is positioned within a housing 809 defining an outer surface 810 of the rotor 801. By including a housing 809 that situates about an exterior of major surfaces of the rechargeable electrochemical cell 806, the assembly 800 of FIG. 8 allows the rechargeable electrochemical cell 806 to be configured in non-cylindrical shapes. Illustrating by example, the rechargeable electrochemical cell 806 of FIG. 8 is rectangular in cross section. This allows a prismatic cell to be used as the rechargeable electrochemical cell 806.

For instance, rather than configuring an electrode assembly as a jellyroll as may be required for the rechargeable electrochemical cells (1106,1206,606) of FIGS. 11-13, the electrode assembly of the rechargeable electrochemical cell 806 of FIG. 8 can be configured in a stacked configuration. The electrode assembly can comprise a lithium-ion or lithium polymer electrode assembly, as lithium-based cells are popular choices for many portable electronic devices due to their light weight and high energy storage density. However, it will be clear to those of ordinary skill in the art having the benefit of this disclosure that other electrode assembly structures could also be used in energy storage assemblies described below. For example, rather than using a lithium-ion electrode assembly or a lithium-polymer cell, a nickel or other chemistry rechargeable electrochemical cell could be used as well.

In one or more embodiments, the electrode assembly of the rechargeable electrochemical cell 806 of FIG. 8 includes an anode, a cathode, and one or more separator layers. The anode serves as the negative electrode, while the cathode serves as the positive electrode. The separator layers prevent these two electrodes from physically contacting each other. While the separator layers physically separate the cathode from the anode, the separator layers permit ions to pass from the cathode to the anode, and vice versa, as noted above.

In one embodiment, the anode and cathode each comprise a foil layer coated with an electrochemically active material. For example, the anode can include a copper foil layer that is coated with graphite in one embodiment. The cathode can include an aluminum foil layer that is coated with Lithium Cobalt Dioxide (LiCoO.sup.2). The separator layers electrically isolate the anode from the cathode and comprise a polymer membrane in one or more embodiments.

The electrode assembly can be placed in an electrolyte. In one embodiment, the electrolyte is an organic electrolyte and provides an ionic conducting medium for lithium ions to move between the anode and cathode during charge and discharge of the electrode assembly.

The stacked electrode assembly can include a plurality of cathodes and a plurality of anodes. Two cathodes and two anodes can be used in an illustrative embodiment for compact assembly in a smartphone, for example, but larger devices such as laptops and tablet computers may include a greater number of each.

In one or more embodiments, the plurality of cathodes and the plurality of anodes can be cut to a desired shape and then stacked together with a plurality of separators disposed therebetween so as to fit within the housing 809. Each cathode of the plurality of cathodes and each anode of plurality of anodes can include a tab electrically coupled to its metal foil layer, which serves as a current collector.

When all layers are placed together, the stacked electrode assembly results. The stacked electrode assembly includes a positive tab coupled to each cathode of the plurality of cathodes and a negative tab coupled to each anode of plurality of anodes. The electrode assembly can then be placed within a foil pouch or other container.

In one or more embodiments, the electrode assembly is placed within a receiver housing with a cover housing coupled thereto. The receiver housing can define a bay comprising a recess or enclosed area that receives the electrode assembly. Illustrating by example, the receiver housing can be manufactured from a single piece of molded thermoplastic. In one embodiment, the thermoplastic comprises a flexible plastic or plastic material to allow for its easy bending and twisting. In other embodiments, the receiver housing can be manufactured from laminated foil. Illustrating by example, a foil core layer can be coated in another material, such as plastic, to form the laminate foil.

The cover can be configured to couple to the receiver housing to enclose and seal the bay. For example, the cover can be manufactured from a flexible thermoplastic as is the receiver housing. In other embodiments, the cover can be manufactured from laminated foil. The cover can be thermally bonded to the receiver housing, adhesively bonded to the receiver housing, sonically welded to the receiver housing, or otherwise coupled to the receiver housing. When so coupled, the cover and the receiver housing form a sealed housing assembly. In other embodiments, the cover will be omitted. Illustrating by example, the receiver housing can be configured as a bag or pouch with an open end that is sealed without requiring a cover, and so forth.

In the illustrative embodiment of FIG. 8, the housing defines a receiver 811 that is configured with an opening that is complementary to the exterior shape of the rechargeable electrochemical cell 806. For example, since the exterior of the rechargeable electrochemical cell 806 is rectangular in FIG. 8, the receiver 811 is configured with a rectangular opening that is complementary in shape and that receives the rechargeable electrochemical cell 806 when inserted therein. Where so configured, the rechargeable electrochemical cell 806 rotates with the housing 809 when the flexible display 803 translates 804.

In other embodiments, the receiver 811 will be configured differently. Illustrating by example, in another embodiment the receiver 811 could be configured as a circle with a diameter that is greater than the diagonal width of the rechargeable electrochemical cell 806. This would allow the rechargeable electrochemical cell 806 to remain stationary while the housing 809 rotates 805 with translation 804 of the flexible display 803. In still other embodiments, an interior sleeve can be placed about the rechargeable electrochemical cell 806. For instance, an interior sleeve having a rectangular receiver and cylindrical outer surface may be placed within a cylindrical receiver 811 of the housing 809. Such a construct would allow the interior sleeve to fixedly situate about the rechargeable electrochemical cell 806 while allowing the housing 809 to rotate about the interior sleeve, and so forth. Other constructs allowing the use of non-cylindrical rechargeable electrochemical cells will be obvious to those of ordinary skill in the art having the benefit of this disclosure. Since the receiver 811 is configured with a shape that is complementary to the exterior shape of the rechargeable electrochemical cell 806, in the illustrative embodiment of FIG. 8 the housing 809 encloses the major faces of the rechargeable electrochemical cell 806.

The use of the housing 809 offers other advantages as well. In the illustrative embodiments of FIGS. 6-7, the rechargeable electrochemical cells (606,1206) were cells only. Embodiments of the disclosure contemplate that modern electronic devices employ charging circuitry, overcharging protection circuitry, current limiting circuitry, and other electrical components with rechargeable electrochemical cells to ensure that they are properly charged and discharged. Such components are also used to extend cycle life of the rechargeable electrochemical cell. Where a housing 809 is included with the rotor 801, these components can be situated within the housing 809 to further maximize space within an electronic device. In other embodiments, these components coupled to a flexible substrate (501) and powered by energy from the rechargeable electrochemical cell, with the flexible substrate translating within the electronic device when the flexible display translates across the translation surface by an amount equal to, or greater than, another amount the flexible display translates across the translation surface, as described above with reference to FIG. 5.

Figure 9:
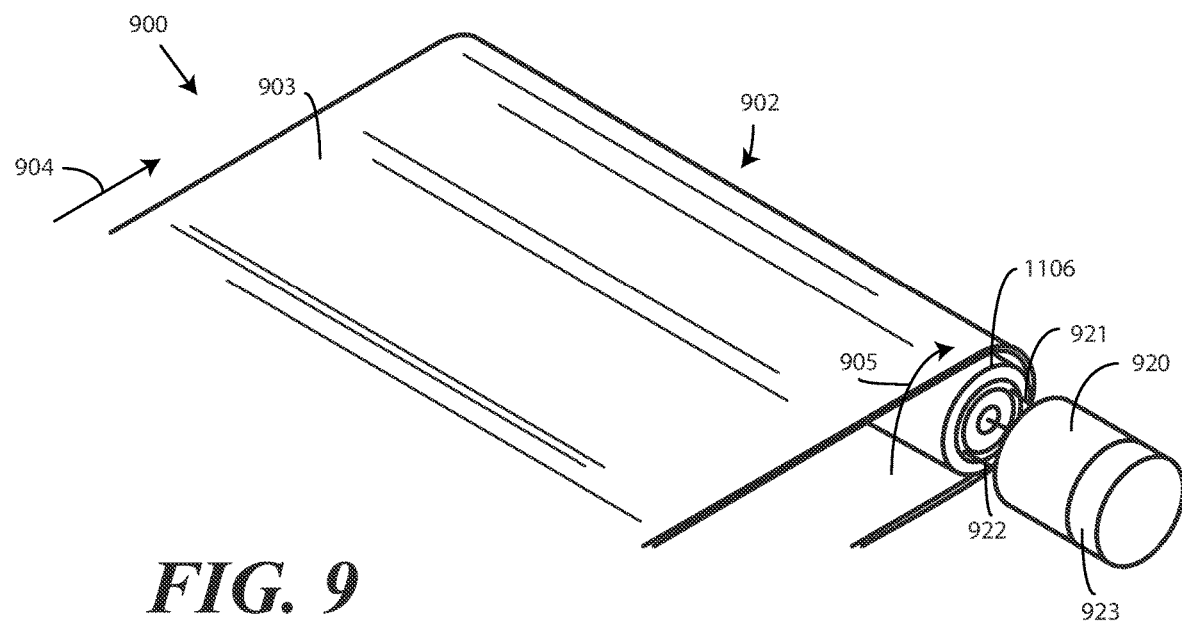
FIG. 9 illustrates another explanatory flexible display and rotor assembly configured in accordance with one or more embodiments of the disclosure.

Turning now to FIG. 9, illustrated therein is another assembly 900 configured in accordance with embodiments of the disclosure. The assembly 900 of FIG. 9 uses the rechargeable electrochemical cell 1106 of FIG. 11 as a rotor 901. The rotor 901 is positioned within a curvilinear section 902 of a flexible display 903 and rotates 905 with translation of the flexible display 903.

The assembly 900 of FIG. 9 also includes a power management circuit 920 that is electrically coupled to the rechargeable electrochemical cell 1106. While shown operating with the rechargeable electrochemical cell 1106 of FIG. 11 for explanatory purposes, it should be noted the power management circuit 920 can be included with the assembly (600) of FIG. 6, the assembly (700) of FIG. 7, the assembly (800) of FIG. 8, or other assemblies, as well as with the rechargeable electrochemical cell (1206) of FIG. 12, the rechargeable electrochemical cell (606) of FIG. 13, or other rechargeable electrochemical cells.

The power management circuit 920 can manage voltage and current during charging and discharging of the rechargeable electrochemical cell 1106. The power management circuit 920 can include a charger that provides power through electrical contacts 921,922 to the rechargeable electrochemical cell 1106. In this illustrative embodiment, the power management circuit 920 is electrically coupled to the rechargeable electrochemical cell 1106 by one or more electrical contacts 921,922 biased against, and slidable along, one or more electrodes (1102,1104) of the rechargeable electrochemical cell 1106.

In one or more embodiments, the power management circuit 920 can convert currents and voltages to levels suitable to charge the rechargeable electrochemical cell 1106. The power management circuit 920 then feeds current to the rechargeable electrochemical cell 1106 during charging cycles so that it can be charged.

The power management circuit 920 can include a control circuit configured to control the amount of charging current that flows to the rechargeable electrochemical cell 1106. In one or more embodiments, the control circuit can include a current control circuit. The current control circuit can include a sense resistor, a field effect transistor (FET), and a diode. The control circuit can determine suitable currents for charging the rechargeable electrochemical cell 1106 by reading data stored in a memory of the rechargeable electrochemical cell 1106 or the power management circuit 920. The control circuit can also measure the temperature of the rechargeable electrochemical cell 1106 by measuring a voltage between a thermistor disposed within the rechargeable electrochemical cell 1106 and a pull-up resistor disposed within the power management circuit 920.

In operation, when the power management circuit 920 is receiving power from a power supply, charging current flows through the charger of the power management circuit 920. The control circuit monitors the amount of charging current being transferred to the rechargeable electrochemical cell 1106 with the sense resistor. The voltage applied to the rechargeable electrochemical cell 1106 is sensed from the electrical contacts 921,922.

During the charging process, in addition to monitoring charging current and charging voltage, the power management circuit 920 can monitor the temperature of the rechargeable electrochemical cell 1106 to ensure charging occurs within the thermal limitations that are set by the manufacturer. If the temperature rises above a predetermined threshold, the power management circuit 920 can reduce the amount of current to avoid compromising the reliability of the rechargeable electrochemical cell 1106.

Since sliding a first device housing (101) relative to a second device housing (102) in an electronic device (100) requires energy, in one or more embodiments some of this energy can be parasitically captured using a regenerative charging circuit 923. In one or more embodiments, the regenerative charging circuit 923 is configured to deliver a charge current, optionally through the power management circuit 920, to the rechargeable electrochemical cell 1106 when one device housing slides relative to another device housing. Illustrating by example, when the assembly 900 of FIG. 9 is implemented in the electronic device (100) of FIG. 1, the regenerative charging circuit 923 can deliver a charging current to the rechargeable electrochemical cell 1106 when the first device housing (101) slides toward, or away from, the second device housing (102). While inclusion of the regenerative charging circuit 923 provides a convenient way to deliver charge current to the rechargeable electrochemical cell 1106 in a pinch, in some embodiments it will be omitted so as not to encourage excessive translation 904 of the flexible display 903, which may increase wear and mechanical strain.

As with the power management circuit 920, while the regenerative charging circuit 923 is shown operating with the rechargeable electrochemical cell 1106 of FIG. 11 in FIG. 9 for explanatory purposes, the regenerative charging circuit 923 can be included with the assembly (600) of FIG. 6, the assembly (700) of FIG. 7, the assembly (800) of FIG. 8, or other assemblies, as well as with the rechargeable electrochemical cell (1206) of FIG. 12, the rechargeable electrochemical cell (606) of FIG. 13, or other rechargeable electrochemical cells. For example, if used with the assembly (700) of FIG. 7, the regenerative charging circuit 920 could deliver current to the rechargeable electrochemical cell (1206) when the sheath (707) rotates. When used with the assembly (800) of FIG. 8, the regenerative charging circuit 920 could deliver current to the rechargeable electrochemical cell 806 when the housing 809 rotates, and so forth.

Figure 10:
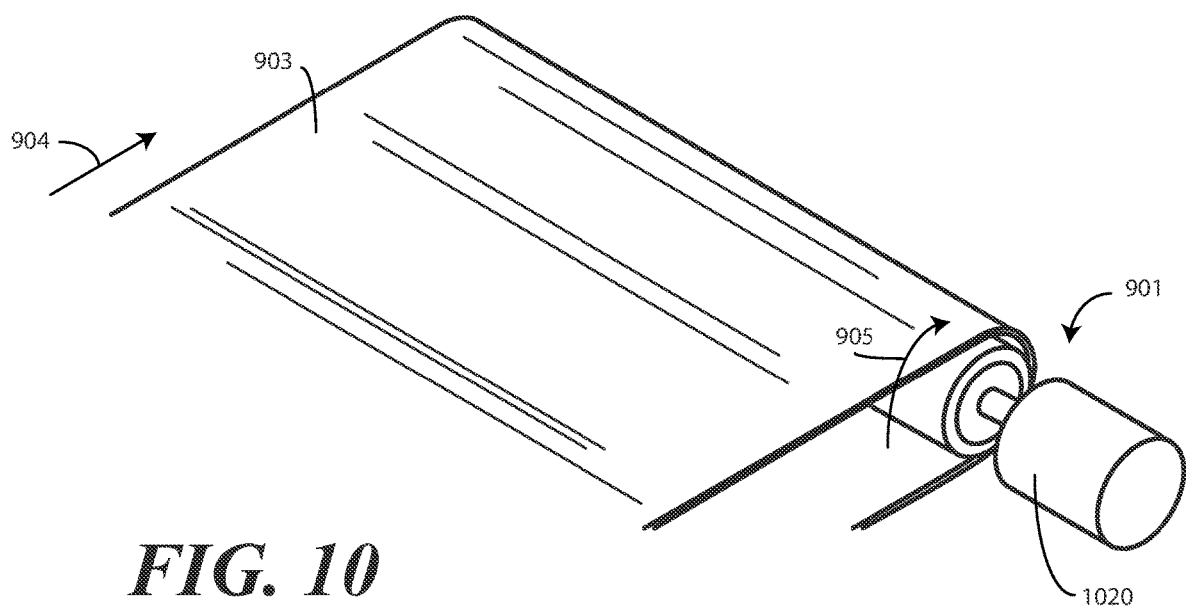
FIG. 10 illustrates another explanatory flexible display and rotor assembly configured in accordance with one or more embodiments of the disclosure.

Additional components can be operable with a rechargeable electrochemical cell functioning as a rotor for a flexible display as well. Turning now to FIG. 10, illustrated therein is one such example.

While the embodiment of FIG. 1 presumes that a user will mechanically slide the first device housing (101) toward, or away from, the second device housing (102), embodiments of the disclosure contemplate that some users may prefer automatic options. Accordingly, in one or more embodiments a motor 1020 can be coupled to the rotor 901. Actuation of the motor 1020 can cause the rotor 901, which is the rechargeable electrochemical cell 1106 of FIG. 11 in this example, to rotate 905. This rotation 905 of the rotor 901 causes the flexible display 903 to translate 904. The motor 1020 of FIG. 10 could be used with any of the assemblies previously described. Where used with the assembly (700) of FIG. 7, the motor 1020 could rotate the sheath 707 about the rechargeable electrochemical cell (1206). Where used with the assembly (800) of FIG. 8, the motor 1020 could rotate the housing (809) and/or rechargeable electrochemical cell (806), and so forth.

Turning now to FIG. 14, illustrated therein is one explanatory sliding electronic device 100 configured in accordance with one or more embodiments of the disclosure. The electronic device 100 includes an assembly 1400 comprising a rotor 1401 positioned within a curvilinear section 1402 of a flexible display 103. It should be noted that while the rotor 1401 is positioned at a "bottom" end of a device housing of the electronic device 100 in FIG. 14, it could equally be placed in the "top" end of the device housing as well. Thus, if FIG. 14 depicts the second device housing (103) of the electronic device 100, in other embodiments the rotor 1401 could be placed at the opposite end of the second device housing. Other configurations will be obvious to those of ordinary skill in the art having the benefit of this disclosure.

The assembly 1400 could be any of the assemblies (600,700,800,900) described above with reference to FIGS. 6-10, or another assembly that will be obvious to those of ordinary skill in the art having the benefit of this disclosure. Accordingly, the rotor 1401 of the assembly 1400 includes a rechargeable electrochemical cell. For ease of illustration, the assembly 1400 is shown generally. It is expected that one of ordinary skill, notwithstanding possibly significant effort and many design choices motivated by, for example, available time, current technology, and economic considerations, when guided by the concepts and principles disclosed above with reference to FIGS. 1-10 will be readily capable of implementing any of the assemblies (600,700,800,900) described above with reference to FIGS. 6-10 into the assembly 1400 of FIG. 14 with minimal experimentation.

As before, in one or more embodiments the electronic device 100 includes a first device housing 101 that is configured to slide relative to a second device housing (102), which is not shown in FIG. 14 to make visibility of the components clearer. In one or more embodiments, the electronic device 100 is slidable between a closed position (300) and an open position (200), as well as to any slidable position therebetween. A flexible display 103 is coupled to the second device housing (102). The flexible display 103 extends into first device housing 101 and translates along a translation surface 1403. The translation surface 1403 could be defined by one or both of the first device housing 101 and the second device housing (102).

In one or more embodiments, a support layer 1404 is positioned between a first portion of the flexible display 103 and the translation surface 1403. The rotor 1401, which comprises an rechargeable electrochemical cell, is positioned within a curvilinear section 1402 of the flexible display 103. The rotor 1401 rotates when a linear translation 1405 of the support layer 1404 and flexible display 103 occurs across the translation surface 1403. In one or more embodiments, the rotor 1401 is caused to rotate when the flexible display 103 translates across the translation surface 1403. In other embodiments, the rotor 1401 draws the flexible display 103 around the rotor 1401 when the rotor 1401 rotates.

In one or more embodiments, the support layer 1404 is fixedly coupled to the first portion of the flexible display 103. Illustrating by example, an adhesive layer 1406 can be positioned between the support layer 1404 and the flexible display 103. Other techniques for coupling the support layer 1404 to the flexible display 103 will be obvious to those of ordinary skill in the art having the benefit of this disclosure.

In one or more embodiments, the support layer 1404 comprises a rigid, substantially planar support layer. Illustrating by example, the support layer 1404 can be manufactured from stainless steel in one or more embodiments. In another embodiment, the support layer 1404 is manufactured from a thin, rigid thermoplastic sheet. Other materials can be used in manufacturing the support layer 1404 as well. For example, the material nitinol, which is a nickel-titanium alloy, can be used to manufacture the support layer 1404. Other rigid, substantially planar materials will be obvious to those of ordinary skill in the art having the benefit of this disclosure.

In one or more embodiments, the display assembly also includes a flexible support structure 1407 positioned between the flexible display 103 and the translation surface 1403. In one or more embodiments, the flexible support structure 1407 is configured with varying support thicknesses across its length. Illustrating by example, in the explanatory embodiment of FIG. 14 the flexible support structure 1407 is thinner at portions where it abuts the support layer 1404 than at portions where it abuts the translation surface 1403.

In one or more embodiments, the flexible support structure 1407 defines a first section and a second section. In one or more embodiments, the first section defines a first section portion extending from the flexible display 103 to the translation surface 1403. Meanwhile, the second section extends from the flexible display 103 to the support layer 1404.

The length of the first section portion that is positioned between the flexible display 103 and the translation surface 1403 changes when the rotor 1401 rotates. Illustrating by example, when the electronic device 100 is in the open position 200 shown in FIG. 14 the first section is longer than in FIG. 15, where the electronic device 100 is in the closed position 300 and the first section portion is shorter.

Referring again to FIG. 14, in one or more embodiments, the first section defines a plurality of engagement teeth. While the rotor 1401 could include a corresponding toothed surface to engage the plurality of engagement teeth, in other embodiments its surface is smooth with distal ends of the plurality of engagement teeth simply abutting the surface of the rotor 1401 as shown in FIGS. 14-15.

As shown in FIG. 14, in one or more embodiments some engagement teeth abut the translation surface 14-3, while other engagement teeth abut the rotor 1401. By comparing FIGS. 14 and 15, it can be seen that the number of engagement teeth abutting the translation surface 14-3 is greater when the electronic device 100 is in the open position 200 than when it is in the closed position 300. The number of engagement teeth abutting the rotor 1401 stays relatively constant since the rotor 1401 has a circular cross section. Accordingly, as the electronic device 100 translates from the closed position 300 to the open position 200, the number of engagement teeth abutting the translation surface 1403 increases. By contrast, when the electronic device translates from the open position 200 to the closed position 300, the number of engagement teeth abutting the translation surface 1403 decreases.

In one or more embodiments, the second section of the flexible support structure 1407 positioned between the support layer 1404 and the flexible display 103 is devoid of engagement teeth. In the illustrative embodiment of FIG. 14, the support layer 1404 is fixedly coupled to the second section of the flexible support structure 1407 by an adhesive.

In one or more embodiments, the flexible support structure 1404 is manufactured as a composite structure from different components. For instance, the portion of the flexible support structure 1404 positioned against and coupled to the flexible display 103 may be manufactured from a flexible material such as a flexible film, while the plurality of engagement teeth are manufactured from a rigid material such as metal or plastic. In other embodiments, the flexible support structure 1404 is a unitary component manufactured from a flexible thermoplastic with the plurality of engagement teeth manufactured by etching. Other configurations for the flexible support structure 1404 will be obvious to those of ordinary skill in the art having the benefit of this disclosure.

As shown in FIGS. 14 and 15, in one or more embodiments a flexible support structure 1407 is coupled to the flexible display 103 between the flexible display 103 and the translation surface 14031. In one or more embodiments, a support layer 1404 holding the flexible display 103 in a planar configuration is then coupled to the second section of the flexible support structure 1407 between the flexible support structure 1407 and the translation surface 1403. When the rotor 1401 rotates in response to the flexible display 103 translating along the translation surface 1403, the support layer 1404 translates along the translation surface 1403 between the flexible support structure 1407 and the translation surface 1403 itself.

As also shown in FIGS. 14-15, a cross section of the flexible display 103 defines a J-shape with a curvilinear section 1402 of the J-shape wrapped around the rotor 1401 and an upper portion of the J-shape passing across the translation surface 1403. When the first device housing 101 shown in FIG. 14 is coupled to a second device housing (102) as described above with reference to FIG. 1, and the first device housing 101 and the second device housing (102) slide relative to each other, the flexible display 103 wraps around the rotor 1401 to extend further from, or back into, the first device housing 101. When the sliding electronic device 100 opens, the upper portion of the J-shape becomes longer as the flexible display 103 wraps around the rotor 1401 and extends further out of the first device housing 101. When the sliding electronic device 100 closes, the upper portion of the J-shape becomes shorter as the reverse operation occurs. Thus, when the first device housing 101 translates relative to the second device housing (102), the flexible display 103 deforms at different locations as it wraps and passes around the rotor 1401.

In one or more embodiments, the rotor 1401 not only facilitates the perceived "extension" of the flexible display 103 that occurs during an opening operation, but also works to improve the reliability and usability of the flexible display 103. This is true because the rotor 1401 defines a service loop in the curvilinear portion of the J-shape about which the flexible display 103 curves. The service loop prevents the flexible display 103 from being damaged or developing memory in the curvilinear portion when the electronic device 100 is in the closed position 300, open position 200, or somewhere in between.

Turning now to FIG. 16, illustrated therein is one explanatory method 1600 in accordance with one or more embodiments of the disclosure. The method 1600 is suitable for use in an electronic device comprising a flexible display, a device housing comprising a translation surface for the flexible display, and a rotor positioned within a curvilinear section of the flexible display and comprising a rechargeable electrochemical cell. In the method 1600 of FIG. 16, the rechargeable electrochemical cell rotates when the flexible display translates.

Beginning at step 1601, the method 1600 comprises a first device housing and/or a second device housing of the electronic device receiving forces translating the first device housing toward, or away from, the second device housing to or between an open position and a closed position. At step 1602, this receipt of forces occurring at step 1601 causes the flexible display to translate across a translation surface defined by one or both of the first device housing and/or the second device housing.

At step 1603, the translation of the flexible display across the translation surface causes the rotor comprising the rechargeable electrochemical cell to rotate. Where a regenerative charging circuit is included, step 1604 can optionally comprise the regenerative charging circuit receiving energy from the mechanical rotation of the rechargeable electrochemical cell and delivering current to the rechargeable electrochemical cell as the first device housing and second device housing translate toward, or away from each other.

Turning now to FIG. 17, illustrated therein is one explanatory method 1700 in accordance with one or more embodiments of the disclosure. The method 1700 is suitable for use in an electronic device comprising a flexible display, a device housing comprising a translation surface for the flexible display, and a rotor positioned within a curvilinear section of the flexible display. For the method 1700 of FIG. 17, the rotor comprises a rechargeable electrochemical cell surrounded by a sheath, with the sheath rotating in response to translation of the flexible display along the translation surface.

Beginning at step 1701, the method 1700 comprises a first device housing and/or a second device housing of the electronic device receiving forces translating the first device housing toward, or away from, the second device housing to or between an open position and a closed position. At step 1702, this receipt of forces occurring at step 1701 causes the flexible display to translate across a translation surface defined by one or both of the first device housing and/or the second device housing.

At step 1703, the translation of the flexible display across the translation surface causes the sheath of the rotor situated about the rechargeable electrochemical cell to rotate. Where a regenerative charging circuit is included, step 1704 can optionally comprise the regenerative charging circuit receiving energy from the rotating sheath and delivering current to the rechargeable electrochemical cell as the first device housing and second device housing translate toward, or away from each other.

Turning now to FIG. 18, illustrated therein is another explanatory method 1800 in accordance with one or more embodiments of the disclosure. The method 1800 is suitable for use in an electronic device comprising a flexible display, a device housing comprising a translation surface for the flexible display, and a rotor positioned within a curvilinear section of the flexible display. For the method 1800 of FIG. 18, the rotor comprises a rechargeable electrochemical cell situated within a housing. In the method 1800, the housing rotates in response to translation of the flexible display along the translation surface, with the rechargeable electrochemical cell situated within the housing optionally rotating as well.

Beginning at step 1801, the method 1800 comprises a first device housing and/or a second device housing of the electronic device receiving forces translating the first device housing toward, or away from, the second device housing to or between an open position and a closed position. At step 1802, this receipt of forces occurring at step 1801 causes the flexible display to translate across a translation surface defined by one or both of the first device housing and/or the second device housing.

At step 1803, the translation of the flexible display across the translation surface causes the housing situated about the rechargeable electrochemical cell to rotate. In one or more embodiments, the rechargeable electrochemical cell rotates with the housing at step 1803. In another embodiment, the rechargeable electrochemical cell is stationary while the housing rotates. Where a regenerative charging circuit is included, step 1804 can optionally comprise the regenerative charging circuit receiving energy from the rotating housing and/or rechargeable electrochemical cell and delivering current to the rechargeable electrochemical cell as the first device housing and second device housing translate toward, or away from each other.

Turning now to FIG. 19, illustrated therein is one explanatory method 1900 in accordance with one or more embodiments of the disclosure. The method 1900 is suitable for use in an electronic device comprising a flexible display, a device housing comprising a translation surface for the flexible display, and a rotor positioned within a curvilinear section of the flexible display. For the method 1900 of FIG. 19, the rotor comprises a rechargeable electrochemical cell. Also, a motor is coupled to the rotor.

Beginning at step 1901, the method 1900 comprises receiving user input actuating the motor. At step 1902, this receipt of the user input occurring at step 1901 causes motor to rotate. At step 1903, rotation of the motor causes the flexible display to translate across a translation surface defined by one or both of the first device housing and/or the second device housing. At step 1904, a power management circuit can optionally charge the rechargeable electrochemical cell of the rotor during rotor rotation or when rotor rotation has stopped.

Figure 20:
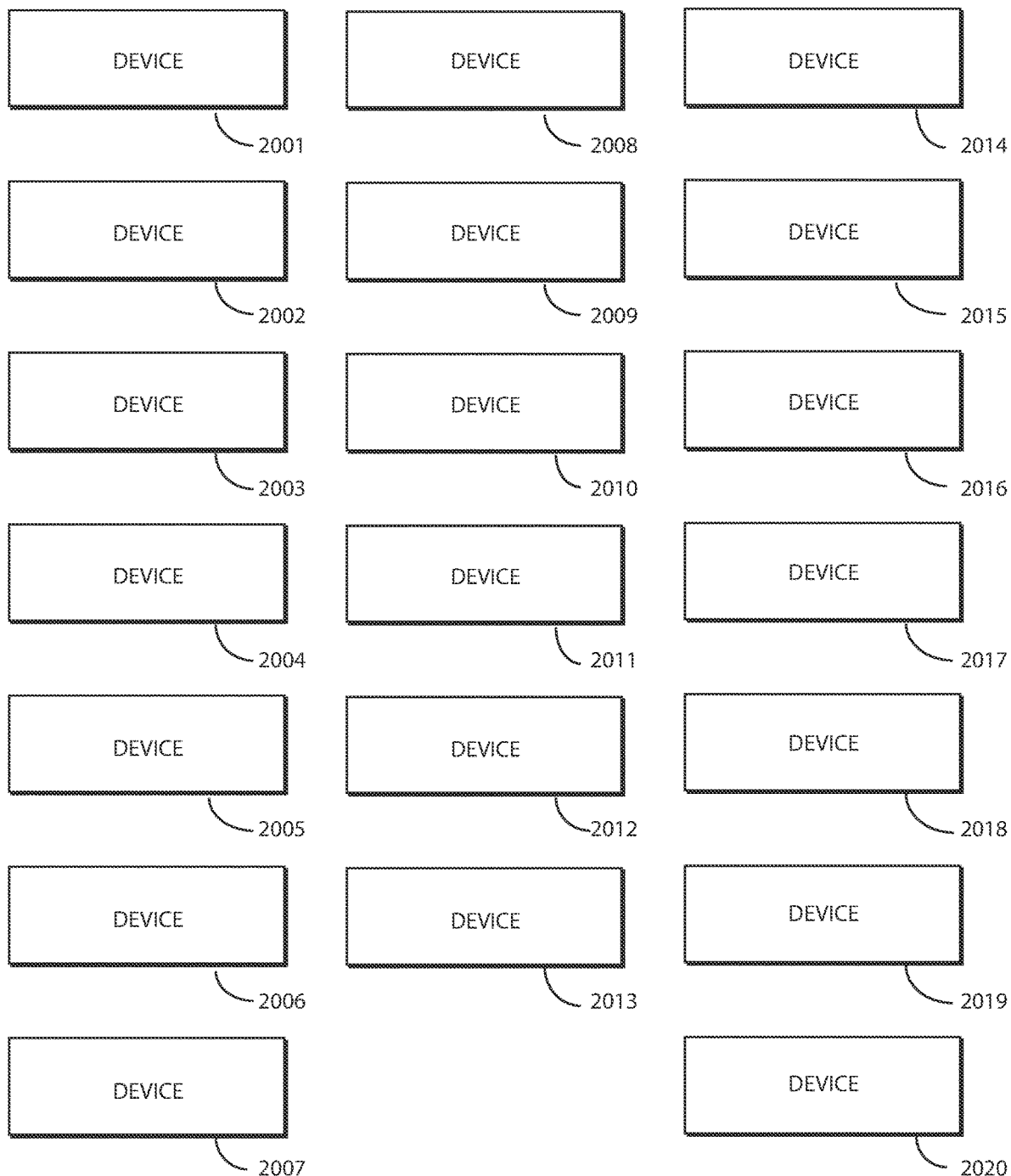
FIG. 20 illustrates one or more embodiments of the disclosure.

Turning now to FIG. 20, illustrated therein are various embodiments of the disclosure. The embodiments of FIG. 20 are shown as labeled boxes in FIG. 20 due to the fact that the individual components of these embodiments have been illustrated in detail in FIGS. 1-19, which precede FIG. 20. Accordingly, since these items have previously been illustrated and described, their repeated illustration is no longer essential for a proper understanding of these embodiments. Thus, the embodiments are shown as labeled boxes.

Beginning at 2001, an electronic device comprises a flexible display. At 2001, the electronic device comprises a device housing comprising a translation surface for the flexible display. At 2001, the electronic device comprises a rotor positioned within a curvilinear section of the flexible display.

At 2001, the rotor rotates with translation of the flexible display across the translation surface. At 2001, the rotor is a rechargeable electrochemical cell.

At 2002, the electronic device of 2001 further comprises a power management circuit electrically coupled to the rechargeable electrochemical cell. At 2003, the power management circuit of 2002 is electrically coupled to the rechargeable electrochemical cell by one or more electrical contacts biased against, and slidable along, one or more electrodes of the rechargeable electrochemical cell. At 2004, the one or more electrodes of 2003 comprises two concentrically aligned electrodes.

At 2005, the electronic device of 2001 further comprises another device housing. At 2005, the other device housing is slidably coupled to the device housing. At 2005, the flexible display is fixedly coupled to the other device housing, while the rotor is positioned in the device housing.

At 2006, the electronic device of 2005 further comprises a regenerative charging circuit configured to deliver a charge current to the rechargeable electrochemical cell when the device housing slides toward, or away from, the another device housing.

At 2007, the electronic device of 2005 further comprises one or more electrical components coupled to a flexible substrate and powered by energy from the rechargeable electrochemical cell. At 2007, the flexible substrate translates within the electronic device when the flexible display translates across the translation surface by an amount equal to, or greater than, another amount the flexible display translates across the translation surface.

At 2008, the electronic device of 2001 further comprises a friction increasing coating applied to an outer surface of the rechargeable electrochemical cell. At 2009, the electronic device of 2001 further comprises a support substrate positioned between the curvilinear section of the flexible display and the rotor.

At 2010, the electronic device of 2001 further comprises a motor coupled to the rotor. At 2010, actuation of the motor causes the translation of the flexible display along the translation surface. At 2011, a cross section of the flexible display of 2001 defines a J-shape with a curved portion of the J-shape wrapped around the rotor and an upper portion of the J-shape passing across the translation surface.

At 2012, an electronic device comprises a flexible display. At 2012, the electronic device comprises a device housing comprising a translation surface for the flexible display.

At 2012, the electronic device comprises a rotor positioned within a curvilinear section of the flexible display. At 2012, the rotor comprises a rechargeable electrochemical cell surrounded by a sheath. At 2012, the sheath rotates in response to translation of the flexible display across the translation surface.

At 2013, the rechargeable electrochemical cell of 2012 remains stationary while the sheath rotates in response to the translation of the flexible display across the translation surface.

At 2014, the electronic device of 2013 further comprises a regenerative charging circuit powered by rotation of the sheath around the rechargeable electrochemical cell. At 2014, the regenerative charging circuit delivers a charging current to the rechargeable electrochemical cell when the flexible display translates across the translation surface.

At 2015, the electronic device of 2012 further comprises one or more electrical components coupled to a flexible substrate and powered by energy from the rechargeable electrochemical cell. At 2015, the flexible substrate translates within the electronic device when the flexible display translates across the translation surface by an amount equal to, or greater than, another amount the flexible display translates across the translation surface.

At 2016, the electronic device of 2012 further comprises another device housing slidably coupled to the device housing. At 2016, sliding the other device housing toward, or away from, the device housing causes both the translation of the flexible display along the translation surface and rotation of the sheath about the rechargeable electrochemical cell.

At 2017, an electronic device comprises a flexible display. At 2017, the electronic device comprises a device housing comprising a translation surface for the flexible display.

At 2017, the electronic device comprises a rotor positioned within a curvilinear section of the flexible display. At 2017, the rotor comprises a rechargeable electrochemical cell positioned within a housing defining an outer surface of the rotor. At 2017, the rotor rotates with translation of the flexible display across the translation surface.

At 2018, the housing of 2017 encloses major faces of the rechargeable electrochemical cell. At 2019, the electronic device of 2017 further comprises a support layer positioned between the flexible display and the translation surface, with the support layer translating across the translation surface when the rotor rotates. At 2020, the electronic device of 2017 further comprises another device housing coupled to the flexible display that translates into the device housing, thereby causing a section of the flexible display to pass about the rotor.

In the foregoing specification, specific embodiments of the present disclosure have been described. However, one of ordinary skill in the art appreciates that various modifications and changes can be made without departing from the scope of the present disclosure as set forth in the claims below. Thus, while preferred embodiments of the disclosure have been illustrated and described, it is clear that the disclosure is not so limited. Numerous modifications, changes, variations, substitutions, and equivalents will occur to those skilled in the art without departing from the spirit and scope of the present disclosure as defined by the following claims.

For example, friction between the plurality of engagement teeth and the translation surface can be reduced by coating the plurality of engagement teeth with a friction reducing coating. Such a coating may additionally leave the plurality of engagement teeth less prone to deterioration. Moreover, while the plurality of engagement teeth was shown with generally rectangular cross sections in one illustrative embodiment, they could be configured with other unique edge geometries that allow them to be less prone to tolerance issues. They could be thicker or thinner as shown as well.

Accordingly, the specification and figures are to be regarded in an illustrative rather than a restrictive sense, and all such modifications are intended to be included within the scope of present disclosure. The benefits, advantages, solutions to problems, and any element(s) that may cause any benefit, advantage, or solution to occur or become more pronounced are not to be construed as a critical, required, or essential features or elements of any or all the claims.

What is claimed is:

1. An electronic device, comprising:
a flexible display;
a device housing comprising a translation surface for the flexible display; and
a rotor positioned within a curvilinear section of the flexible display, the rotor rotating with translation of the flexible display across the translation surface;
wherein the rotor is a rechargeable electrochemical cell; and
further comprising a friction increasing coating applied to an outer surface of the rechargeable electrochemical cell.

2. The electronic device of claim 1, further comprising a power management circuit electrically coupled to the rechargeable electrochemical cell.

3. The electronic device of claim 2, the power management circuit electrically coupled to the rechargeable electrochemical cell by one or more electrical contacts biased against, and slidable along, one or more electrodes of the rechargeable electrochemical cell.

4. The electronic device of claim 3, the one or more electrodes comprising two concentrically aligned electrodes.

5. The electronic device of claim 1, further comprising another device housing, wherein:
the another device housing is slidably coupled to the device housing;
the flexible display is fixedly coupled to the another device housing; and
the rotor is positioned in the device housing.

6. The electronic device of claim 5, further comprising a regenerative charging circuit configured to deliver a charge current to the rechargeable electrochemical cell when the device housing slides toward, or away from, the another device housing.

7. The electronic device of claim 5, further comprising one or more electrical components coupled to a flexible substrate and powered by energy from the rechargeable electrochemical cell, wherein the flexible substrate translates within the electronic device when the flexible display translates across the translation surface by an amount equal to, or greater than, another amount the flexible display translates across the translation surface.

8. The electronic device of claim 1, wherein the friction increasing coating comprises an elastomeric component.

9. The electronic device of claim 1, further comprising a support substrate positioned between the curvilinear section of the flexible display and the rotor.

10. The electronic device of claim 1, further comprising a motor coupled to the rotor, wherein actuation of the motor causes the translation of the flexible display along the translation surface.

11. The electronic device of claim 1, wherein a cross section of the flexible display defines a J-shape with a curved portion of the J-shape wrapped around the rotor and an upper portion of the J-shape passing across the translation surface.

12. An electronic device, comprising:
a flexible display;
a device housing comprising a translation surface for the flexible display; and
a rotor positioned within a curvilinear section of the flexible display, the rotor comprising a rechargeable electrochemical cell surrounded by a sheath, the sheath rotating in response to translation of the flexible display across the translation surface; and
wherein the rechargeable electrochemical cell remains stationary while the sheath rotates in response to the translation of the flexible display across the translation surface;
further comprising a regenerative charging circuit powered by rotation of the sheath around the rechargeable electrochemical cell, the regenerative charging circuit delivering a charging current to the rechargeable electrochemical cell when the flexible display translates across the translation surface.

13. The electronic device of claim 12, wherein the rechargeable electrochemical cell comprises a lithium-based cell.

14. The electronic device of claim 12, further comprising another device housing that is slidable relative to the device housing, wherein the regenerative charging circuit delivers a charging current to the rechargeable electrochemical cell when the another device housing slides relative to the device housing.

15. The electronic device of claim 12, further comprising one or more electrical components coupled to a flexible substrate and powered by energy from the rechargeable electrochemical cell, wherein the flexible substrate translates within the electronic device when the flexible display translates across the translation surface by an amount equal to, or greater than, another amount the flexible display translates across the translation surface.

16. The electronic device of claim 12, further comprising another device housing slidably coupled to the device housing, wherein sliding the another device housing toward, or away from, the device housing causes both the translation of the flexible display along the translation surface and rotation of the sheath about the rechargeable electrochemical cell.

17. An electronic device, comprising:
a flexible display;
a device housing comprising a translation surface for the flexible display; and
a rotor positioned within a curvilinear section of the flexible display, the rotor rotating with translation of the flexible display across the translation surface;
wherein the rotor is a rechargeable electrochemical cell; and
further comprising a power management circuit electrically coupled to the rechargeable electrochemical cell, the power management circuit electrically coupled to the rechargeable electrochemical cell by one or more electrical contacts biased against, and slidable along, one or more electrodes of the rechargeable electrochemical cell, the one or more electrodes comprising two concentrically aligned electrodes.

18. The electronic device of claim 17, wherein the power management circuit is configured to convert currents and voltages to levels suitable to charge the rechargeable electrochemical cell.

19. The electronic device of claim 17, further comprising a sheath positioned around the rechargeable electrochemical cell.

20. The electronic device of claim 17, wherein the one or more electrical contacts remain stationary when the rechargeable electrochemical cell rotates.

\* \* \* \* \*